March 23, 1943. C. B. DE VLIEG 2,314,483
AUTOMATIC GRINDER
Filed Feb. 6, 1941 13 Sheets-Sheet 1

INVENTOR
Charles B. DeVlieg.
BY
Dike, Calvert Gray
ATTORNEYS.

March 23, 1943.  C. B. DE VLIEG  2,314,483
AUTOMATIC GRINDER
Filed Feb. 6, 1941   13 Sheets-Sheet 3

INVENTOR
Charles B. DeVlieg.
BY
Dike, Calver & Gray
ATTORNEYS.

March 23, 1943.   C. B. DE VLIEG   2,314,483
AUTOMATIC GRINDER
Filed Feb. 6, 1941     13 Sheets-Sheet 4

INVENTOR
Charles B. DeVlieg.
BY
Dike Calvert & Gray
ATTORNEYS.

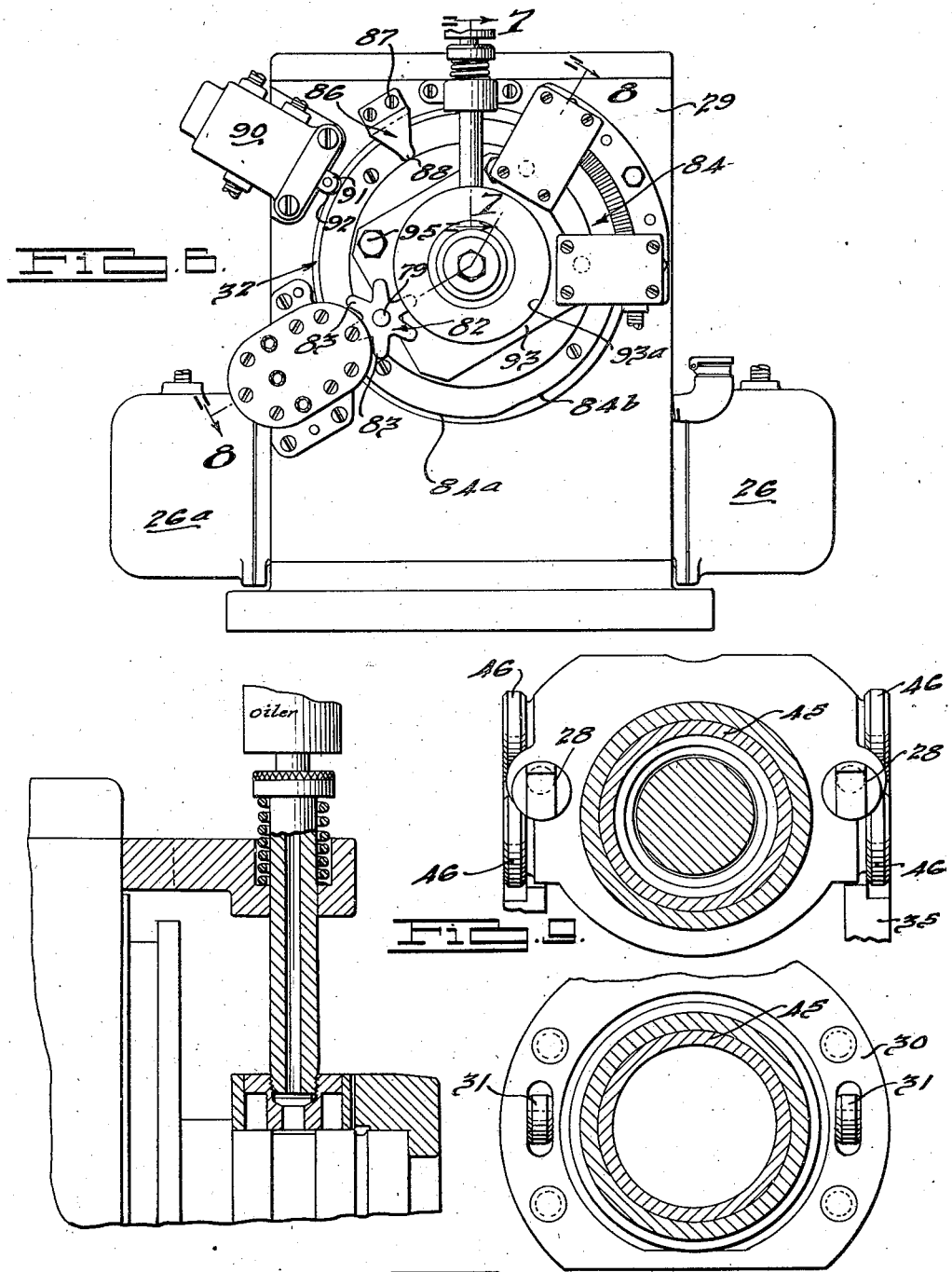

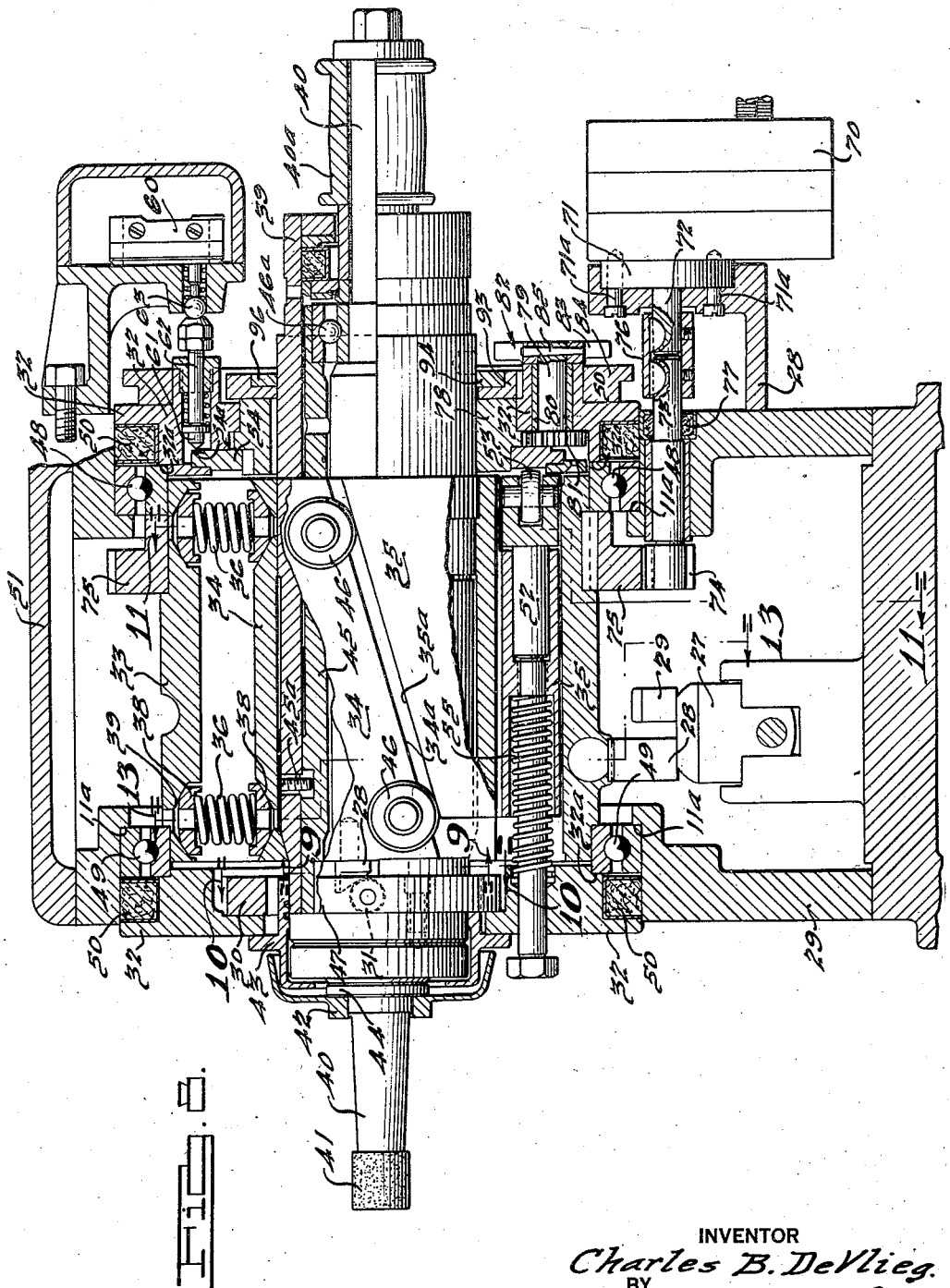

March 23, 1943.  C. B. DE VLIEG  2,314,483
AUTOMATIC GRINDER
Filed Feb. 6, 1941  13 Sheets-Sheet 7
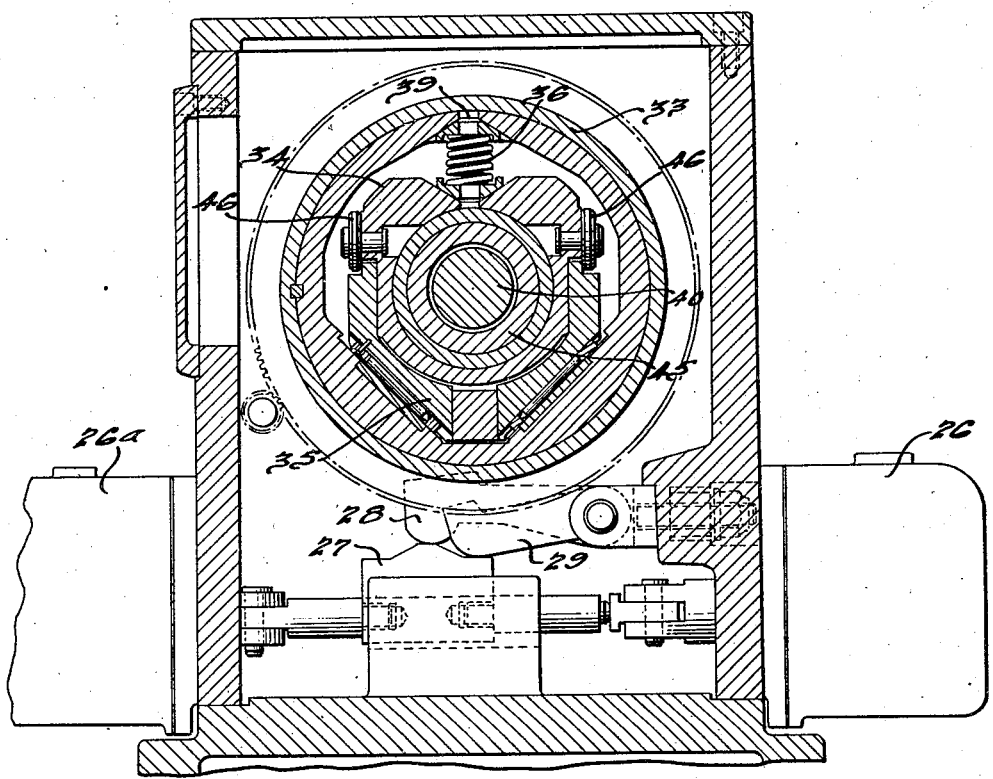
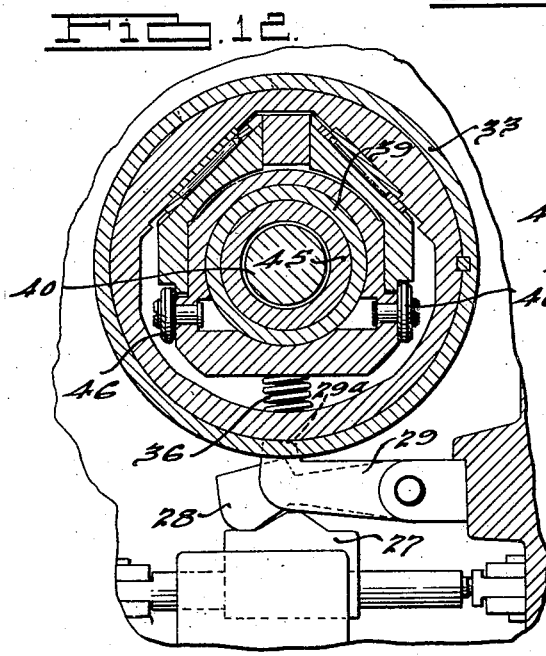
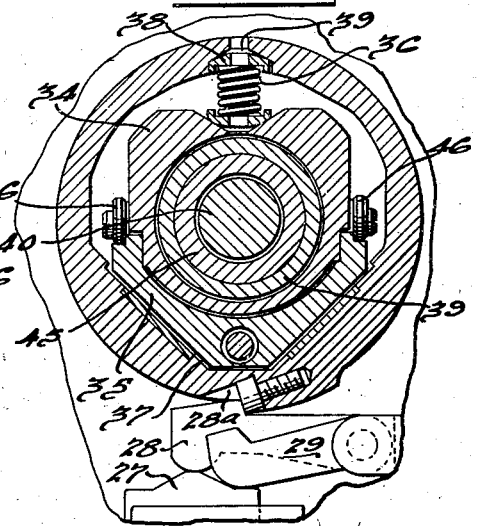
INVENTOR
Charles B. DeVlieg
BY
Dike Calver & Gray
ATTORNEYS

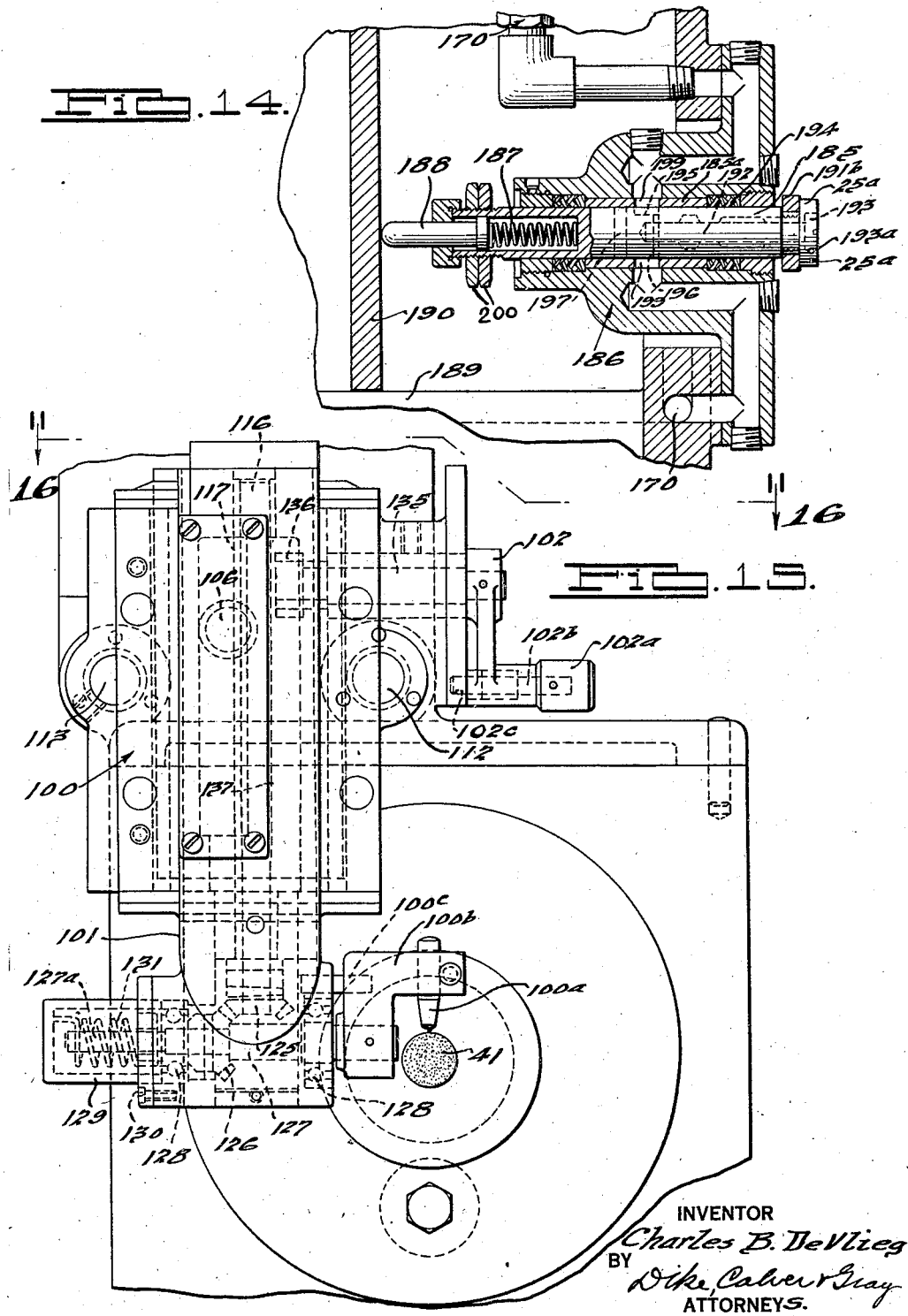

March 23, 1943.  C. B. DE VLIEG  2,314,483
AUTOMATIC GRINDER
Filed Feb. 6, 1941   13 Sheets-Sheet 9

INVENTOR
Charles B. DeVlieg
BY
Dike, Calver & Gray
ATTORNEYS.

INVENTOR
Charles B. DeVlieg.
BY
Dike Calvert Gray
ATTORNEYS.

March 23, 1943.   C. B. DE VLIEG   2,314,483
AUTOMATIC GRINDER
Filed Feb. 6, 1941   13 Sheets-Sheet 11
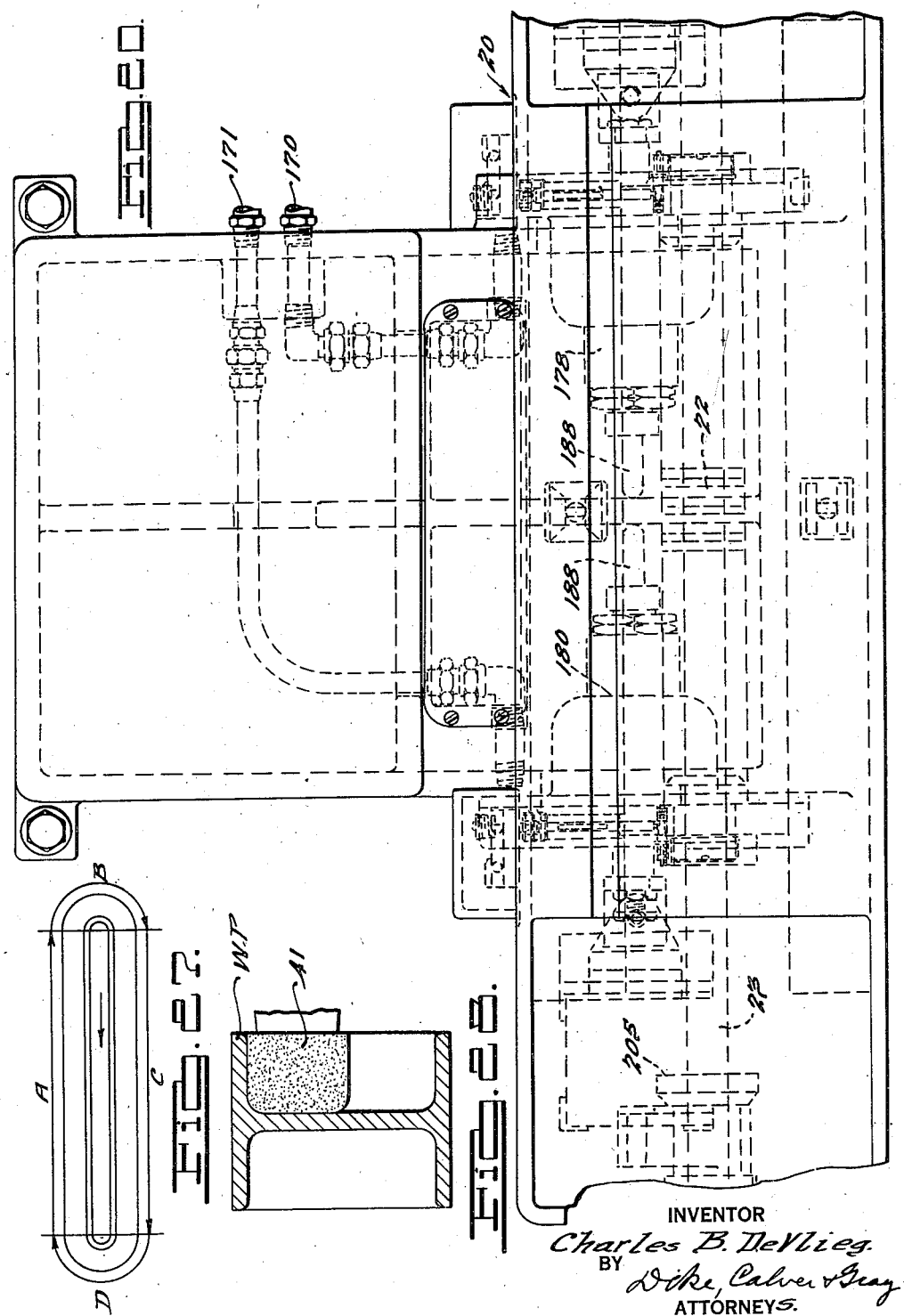
INVENTOR
Charles B. DeVlieg.
BY
Dike, Calver & Gray
ATTORNEYS.

March 23, 1943. C. B. DE VLIEG 2,314,483
AUTOMATIC GRINDER
Filed Feb. 6, 1941 13 Sheets-Sheet 12
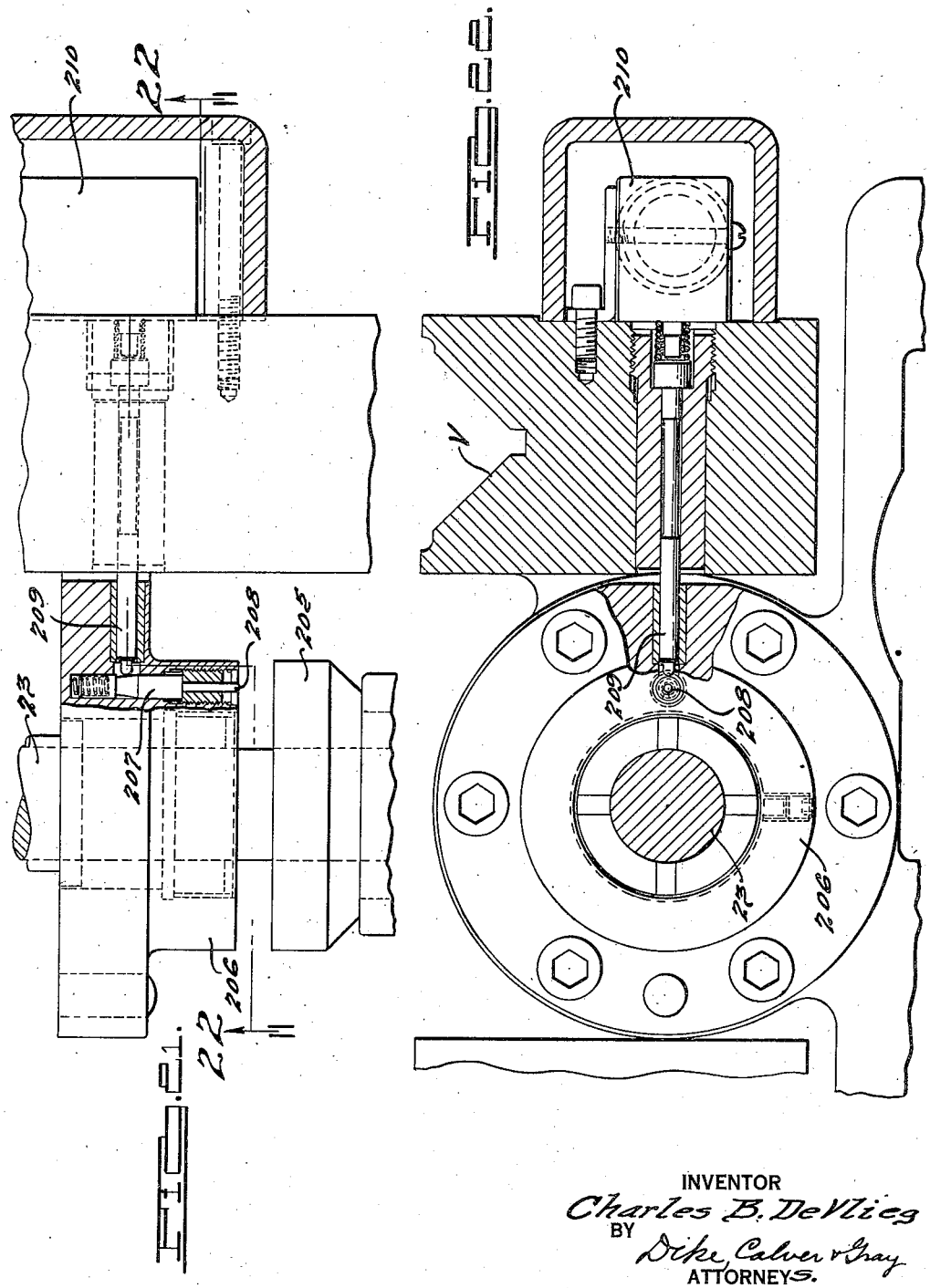
INVENTOR
Charles B. DeVlieg
BY
Dike, Calver & Gray
ATTORNEYS.

March 23, 1943.  C. B. DE VLIEG  2,314,483
AUTOMATIC GRINDER
Filed Feb. 6, 1941  13 Sheets-Sheet 13
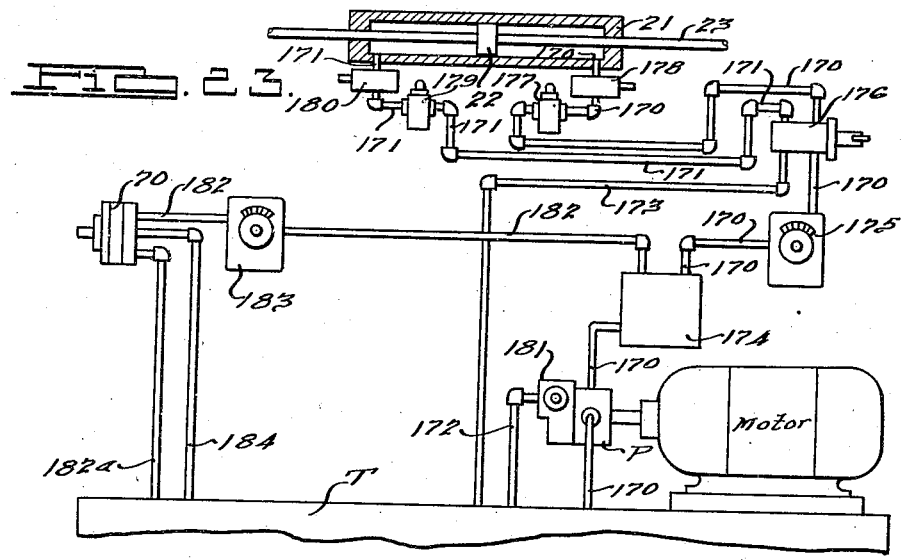
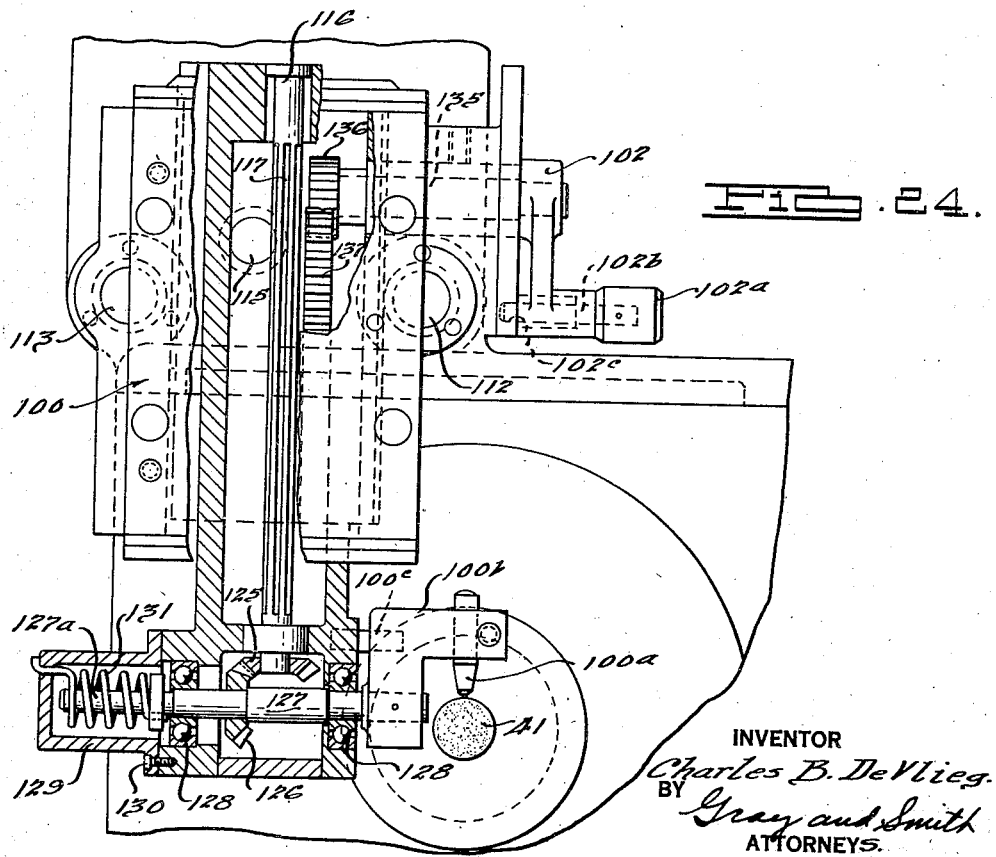
INVENTOR
Charles B. DeVlieg.
BY Gray and Smith
ATTORNEYS.

Patented Mar. 23, 1943

2,314,483

UNITED STATES PATENT OFFICE 2,314,483

AUTOMATIC GRINDER

Charles B. De Vlieg, Detroit, Mich., assignor to Le Maire Tool & Manufacturing Company, Dearborn, Mich., a corporation of Michigan Application February 6, 1941, Serial No. 377,580

13 Claims. (Cl. 51—90)

This invention relates to grinding machines and more particularly to grinding machines which operate automatically and which are capable of grinding or machining articles of various shapes such, for example, as articulate connecting rods for airplane engines and particularly the channels or web portions of such connecting rods.

Prior to the present invention, it has been necessary for machinists to grind or dress the channels of connecting rods, for example, by hand manipulated tools or grinders. This was a very slow and tedious operation and resulted in irregularities and lack of uniformity in section requiring that the part be made slightly larger and heavier to take care of these irregularities. Moreover, the grinding could be done only for short intervals between which the ground face or surface had to be micrometer checked to determine the amount of metal removed so as to prevent the removal of too much of the metal. It will be appreciated that connecting rods, for example, especially those formed from metal alloy for high speed engines, must be formed accurately and balanced as to weight. In other words, they must be finished with precision. Because of the necessity of hand controlled grinding or machining of such parts, the cost of the finished product was extremely high, in some instances excessive. By virtue of the present invention, the entire surfaces of the channels of a connecting rod may be ground automatically by the machine, said machine being entirely automatic except for the necessity of placing the work in the machine, removing said work, and for reversing the position of the faces of the work to present them alternately to the grinding or machining tool or tools. Aside from loading and unloading the workpieces and the shifting thereof while in the machine to present the opposite face to the grinding machining tool, the entire machine functions automatically after it has been once started by manipulating a starter handle, switch or button.

It is, therefore, one of the objects of the present invention to provide a machine for performing grinding operations on metal articles of various sizes and shapes, such for example as engine connecting rods, in which the operation of grinding or machining the parts, feeding of the parts relative to the grinding tool during the grinding thereof, etc., is automatically controlled.

Another object of the present invention is to provide a machine of the foregoing character with means for regulating the amount of grind, that is, the amount of metal to be removed from the workpiece and one in which the work is fed relative to the grinding wheel or tool in accordance with the requirements thereof; and wherein the speed of rotation or operation of the grinding tool is constant.

Another object of the present invention is to provide a feeding means capable of readjusting the grinding wheel at each stroke of the cycle to a minutely accurate degree because on wheels of the diameter required for the present type of work, feeding the wheel greater than .00015 per cycle, serves only to break down the wheel diameter and not remove metal.

Moreover, it is important to have on the finishing operations a pronounced deceleration of the speed of the cycle travel to enable the grinding wheel to finish with an accurately smooth surface.

Another object of the present invention is to provide means for dressing the grinding wheel or tool, which means may be automatically operated at predetermined times so as to maintain or redress the wheel to the generated or normal form required.

A further object of the present invention is to provide an automatic grinding machine having a work supporting or carrying saddle and table which may be actuated hydraulically and which are controlled by positive stops to give the required forward and return straight movement, in which the hydraulic actuation of the table and saddle is coordinated through a hydraulic circuit with a high-speed grinding wheel or head and carrier capable of generating a true radius on the workpiece at each end of the stroke.

Another object of the present invention is to provide a machine of the foregoing character in which, during the grinding cycle, the table carrying the connecting rod or other article or workpiece moves forward longitudinally in a straight line path in one direction, stops accurately and causes the grinding tool spindle to generate the necessary radius at one end of the rod channel, moves longitudinally in the opposite direction, grinds the opposite end of the rod channel, stops accurately, causes the tool spindle to generate the necessary radius at the opposite end of said channel, and continues this movement back and forth for approximately thirty to forty strokes, or until the grinding operation has been completed.

The above and other objects and advantages of the present invention will appear from the following description and appended claims when considered in connection with the accompanying drawings forming a part of the present specification, wherein like reference characters designate corresponding parts in the several views.

In said drawings:

Fig. 6 is an elevational view of the rear end of the machine taken substantially along the line 6—6 of Fig. 2, looking in the direction of the arrows.

Fig. 7 is an enlarged sectional view taken substantially along the line 7—7 of Fig. 6, looking in the direction of the arrows.

Fig. 8 is an enlarged longitudinal sectional view taken substantially along the line 8—8 of Fig. 6, looking in the direction of the arrows.

Fig. 9 is a sectional view taken substantially along the line 9—9 of Fig. 8, looking in the direction of the arrows.

Fig. 10 is a sectional view taken substantially along the line 10—10 of Fig. 8, looking in the direction of the arrows.

Fig. 11 is a transverse sectional view taken substantially along the line 11—11 of Fig. 8, looking in the direction of the arrows.

Fig. 12 is a fragmentary sectional view, generally similar to Fig. 11, but showing the parts after having been rotated 180°.

Fig. 13 is a fragmentary sectional view generally similar to Fig. 11, but taken substantially along the line 13—13 of Fig. 8, looking in the direction of the arrows.

Fig. 14 is a fragmentary enlarged horizontal sectional view taken substantially along the line 14—14 of Fig. 3, looking in the direction of the arrows and showing one of the valve units and operating means therefor forming a part of the invention, the valve being shown in a different position from which it is shown in Fig. 3.

Fig. 15 is an enlarged front elevational view taken substantially along the line 15—15 of Fig. 2, looking in the direction of the arrows and showing the wheel dressing mechanism for the grinding tool of the present machine.

Fig. 20 is a horizontal sectional view taken substantially along the line 20—20 of Fig. 3, looking in the direction of the arrows.

Fig. 21 is an enlarged fragmentary view, partly in section, of a portion of the mechanism shown in Fig. 20, parts thereof being broken away.

Fig. 22 is a vertical sectional view taken substantially along the line 22—22 of Fig. 21, looking in the direction of the arrows.

Fig. 23 is a diagrammatic view illustrating the hydraulic system for operating certain parts or units of the machine of the present invention.

Fig. 24 is a view similar to Fig. 15, parts being broken away for clarity and showing the mechanism of Fig. 15 somewhat more in detail.

Fig. 26 is a diagrammatic view illustrating the travel of the diamond dressing tool with relation to the grinding wheel during the operation of dressing said wheel.

Fig. 27 is a diagrammatic view showing the path of travel or movement of the workpiece with relation to the workpiece; and Fig. 28 is a diagrammatic view illustrating one position of the workpiece with relation to the grinding wheel.

Figure 1:
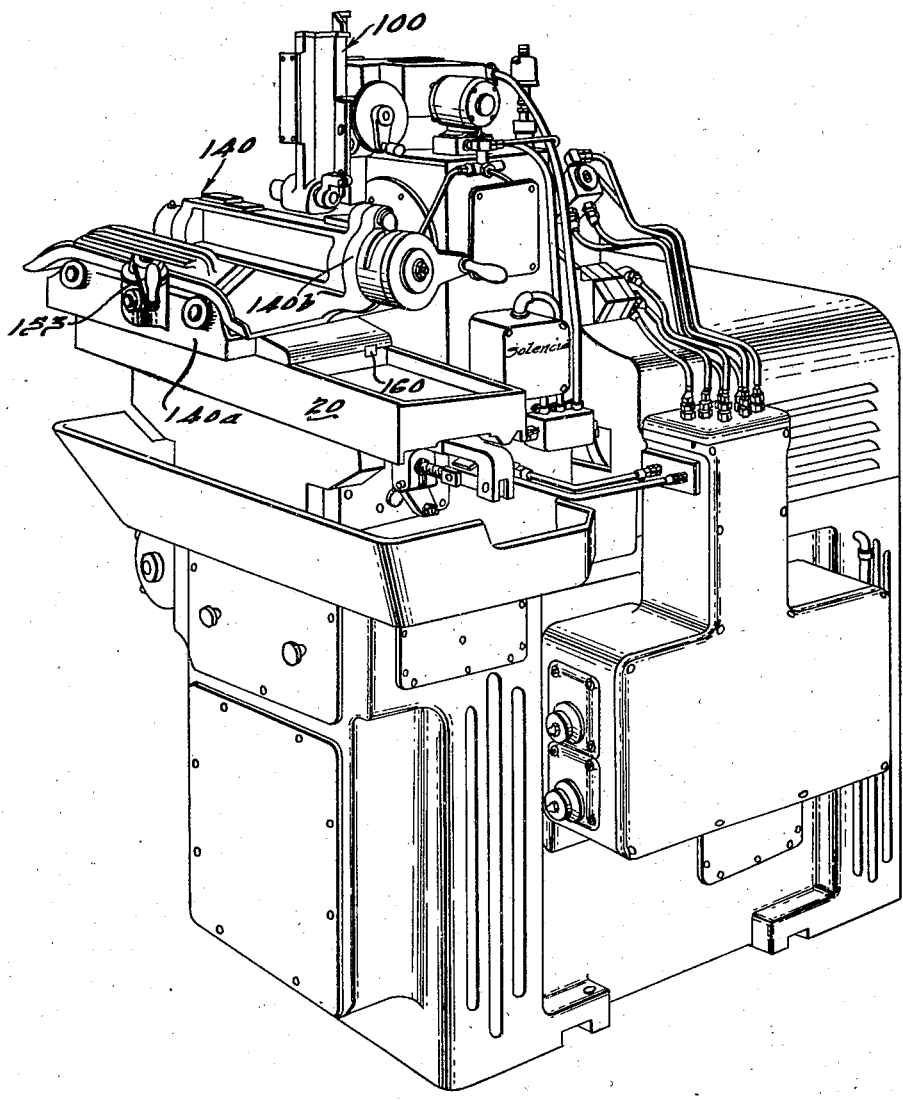
Fig. 1 is a perspective view of the machine of the present invention looking from the operator's or front side of the machine.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

As stated above, the machine embodying the present invention comprises a plurality of interrelated and coordinated units of mechanisms which are controlled electrically and/or hydraulically for the purpose of grinding or machining objects such, for example, as connecting rods for use in airplane engines which have to be machined to precision measurements which are predetermined for the given engines with which or in which the connecting rods are used. The machine includes a work table and a work holding fixture which table and fixture are coordinated in their movements with an automatically operated grinding wheel or tool which is advanced toward the work and which performs its grinding or machining operation on the work to complete the finished job on the workpiece. It is necessary, during the grinding of a series or a plurality of workpieces, to dress the grinding tool or wheel and the machine includes a manually controlled and automatically operated diamond dresser for maintaining the contour or outline of the grinding tool constant. It has been discovered in practice that the grinding tool or wheel is capable of performing its grinding operations upon two or more connecting rods, for example, without the necessity of being dressed by the diamond cutting or dressing tool. Therefore, it will be understood that two or more of the workpieces, such as the connecting rods referred to, may be properly ground or machined, without the necessity of a pause in the continuation of the work of completing or finishing the connecting rods. It will be understood further that the diamond dressing tool has a predetermined setting so that to redress the grinding tool, it is merely necessary to set into operation the mechanism for advancing the dressing tool over the surface of the grinding wheel to redress or reshape it for a continuation of its grinding or machining operations upon the workpieces fed to the machine. The machine includes a work holding fixture, as stated above, which enables the placement into the fixture of a workpiece with ease and facility and which also permits the ready and easy removal of the workpiece after the grinding or machining operation has been completed.

As stated above, the machine is started by operating a switch or throwing a lever which sets into operation the mechanisms for performing the several operations of the machine. Aside from the fact that the machine has to be started manually and the workpieces applied to the work holding fixture and removed therefrom manually, the entire operation of the machine is automatic.

By way of example, one particular system of hydraulic means for operating certain of the parts or units of the machine and one typical electrical diagram for the electrical devices of the machine have been shown. It will be understood, however, that variations in the arrangement of the hydraulic means for actuating certain of the parts or units of the machine as well as the electrical arrangement or diagram may be varied in accordance with the particular demands of the machine. Therefore, it will be understood that the disclosure herein of the hydraulic mechanism, the conduits and passages for feeding the fluid to the various parts to be hydraulically operated, as well as the electrical diagram and the various solenoids, switches and other electric devices for controlling the various parts electrically, may be varied as desired in accordance with the demands of the particular machine and without departing from the scope or spirit of the present invention.

Before proceeding with a complete description of the mode of operation of the various units and/or parts of the present machine, the various units and their particular functions will be pointed out individually and it is believed, that a complete understanding of the construction and mode of operation of these various units or parts will be apparent from the following description thereof:

*Control and actuation of the grinding wheel*

The grinding wheel or tool of the present machine, see particulary Figs. 2, 5, 8, 15 and 25 is moved horizontally toward the workpiece and at the same time angularly in an upward and forward direction toward the workpiece by reason of the provision of a so-called two-slide arrangement shown in detail in Figs. 8 and 11 to 13, inclusive, of the drawings. The so-called two-slide arrangement comprises a unit which is incorporated with the high speed grinding spindle unit of the machine. An out-feed and up-feed roller carrier is shown as a whole at 30. This carrier is cut away or recessed to support an anti-friction roller 31 which, as will be explained below, is adapted to engage the upwardly and forwardly inclined face or surface of a button member or angular abutment which in turn is supported by the upper slide member 34. A retainer ring 32 is provided and serves to maintain the roller carrier 30 in position. The assembly which constitutes the grinding tool or wheel operating and feeding mechanism includes, as shown, a cylindrical barrel or drum which is shown as a whole at 33. An upper slide member 34 and a lower slide member 35 are supported within this barrel or drum. The barrel is provided with a so-called V-way or slide-way shown as a whole at 37 and a pair of compression springs 36 are provided for the purpose of holding the entire head assembly in position within the slide-way. Spherical washers 38 are engaged by the opposite ends of the coil springs and provide seats for said springs. These washers are adapted to seat in spherical seats or sockets 39 formed in the inner face of the barrel or drum 33 and the upper slide member 34, respectively. The members 36 and 38 together cooperate to hold the upper and lower slide members 34 and 35 together as a unit and also seated in the V-way at all times and thus prevent any backlash or play when the slides are being moved toward the workpiece.

The high speed spindle of the present machine comprises a spindle cartridge 39 and a spindle proper 40. The spindle carries at its outer end the grinding wheel or tool 41 of the machine. As best seen in Fig. 8, a protector shield or so-called slinger 42 is pressed onto the outer diameter of the spindle 40 to prevent the ingress of particles of grinding dust from the tool or grinding wheel and also the ingress of the cutting compound or coolant which is used during the grinding operation on the workpiece or connecting rod. An additional shield member 43 is provided and it will be seen that this shield has a friction fit over the outside diameter of the spindle cartridge 39 and is provided with a flange having a flat bearing surface which engages the adjacent face of the retainer ring 32. The spindle adjacent the shield 43 is provided with a take-up nut 44 for adjustment of the spindle bearings. A lockscrew 45a is provided to prevent relative rotation of the spindle cartridge 39 on the bearing carrier sleeve 45.

The barrel or drum 33 is journalled on ball bearings 48 and 49 located adjacent its rear and front ends, respectively. These ball bearings 48 and 49 are interposed between a drum or barrel 33 and the adjacent walls of the housing member 29, the bearings having a relatively tight fit between these members when the parts are assembled. The inner opposed upright faces or walls of the bearings 48 and 49 engage shoulders 11a formed on the housing member 29 and the upright outer faces or surfaces of the bearings are engaged by shoulders or abutments 32a which are formed on the inner faces or surfaces of the front and rear retainer rings or members 32. Suitable adjustment and locking screws (not shown) are provided for the purpose of drawing the retainer rings into position relative to the barrel or drum 33 and also the shoulders 11a of the housing. It will be seen that oil seals 50 are located between the retainer rings and the ball bearings and provide means for preventing the escape of oil or other lubricants from the interior of the mechanism just described. These ring-like seals 50 likewise prevent the ingress of foreign particles thrown off during the operation of grinding the workpiece or connecting rod. As shown, the oil seals are held in fixed position with relation to the parts by means of the aforesaid retainer rings 32. As best seen in Fig. 8, the top of the housing 29 is provided with a removable cover shown as a whole at 51.

A horizontally extending plunger 52 which carries at its rear or inner end a roller 53, which roller is preferably mounted in a yoke or bifurcated rear end of the plunger, is held in contact with the adjacent stepped face of a face cam 54. A compression spring 55 is provided for the purpose of maintaining the roller 53 in position against the stepped face of the cam 54.

It will be seen that the upper slide member 34 and the lower slide member 35 have corresponding upwardly and rearwardly inclined surfaces or faces 34a and 35a, respectively. Front and rear pairs of rollers 46 are carried by the upper slide members and engage or contact the surfaces or faces 35a of the lower slide member 35. The purpose of these rollers is to prevent friction between the two slide members. As the successive stepped faces of the face cam 54 engage the roller 53, the plunger 52 moves the lower slide member 35 forwardly in the direction of the workpiece. This forward movement of the lower slide member causes a forward and upward movement of the upper slide member 34 and the angular abutment or member 28 carried by said upper slide member and which engages the anti-friction roller 31, causes a forward and upward angular movement of the upper slide 34 which houses the spindle cartridge 39 and likewise causes a similar movement of the spindle 40 and the grinding wheel or tool 41. The complete operation of the face cam 54 and the movement of the slides 34 and 35 together with the tool spindle 40 and the grinding wheel 41 will be described in detail hereinafter.

*The work table and means for reciprocating it, etc.*

Figure 3:
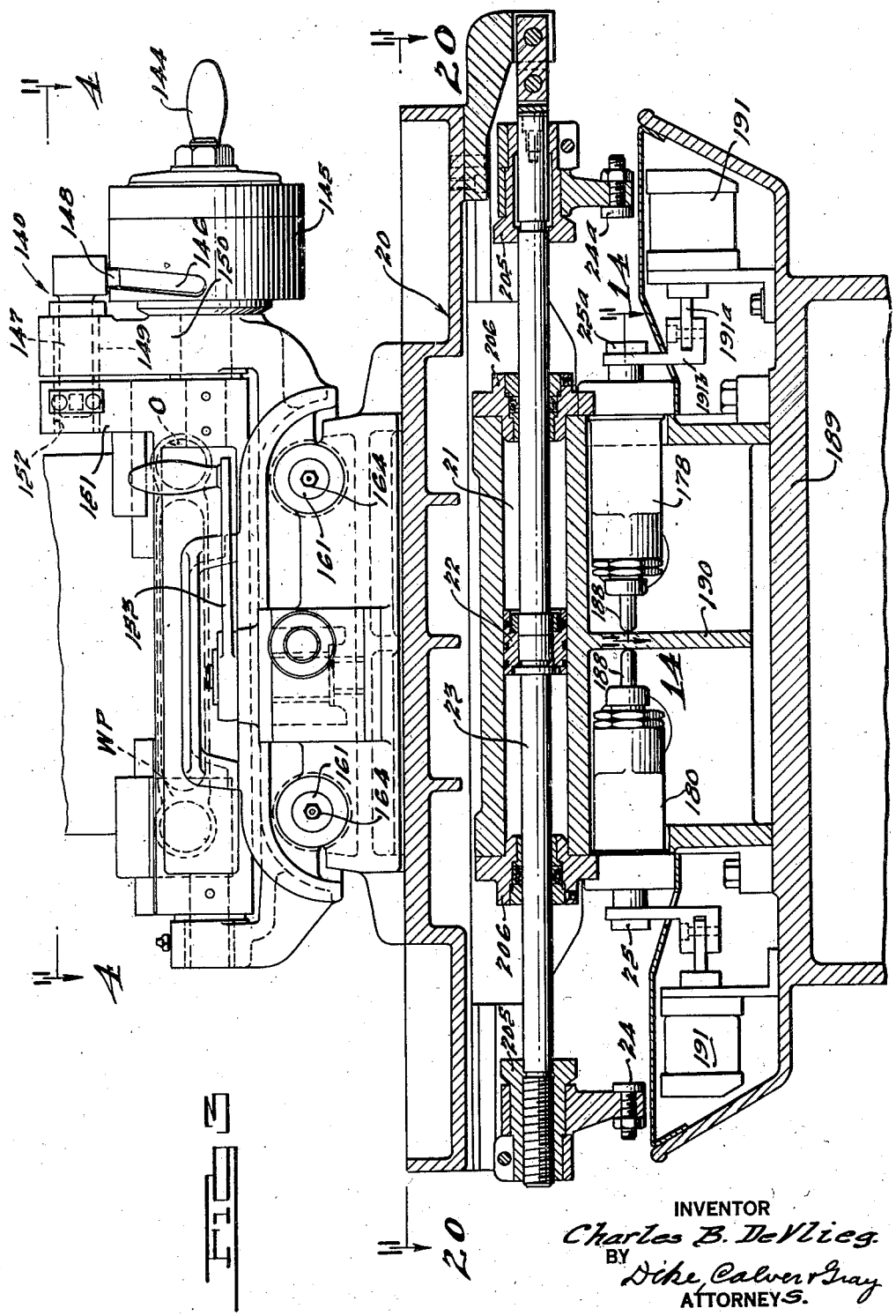
Fig. 3 is an enlarged sectional view taken substantially along the line 3—3 of Fig. 2, looking in the direction of the arrows.

Referring particularly to Fig. 3 of the drawings, it will be understood that hydraulic pressure is admitted to a cylinder 21 at one end of the reciprocating piston 22 therein to advance the work table 20 to one end of its stroke. It will be understood, of course, that the work table 20 is reciprocated transversely of the machine relative to the grinding wheel 41. At the end of this stroke of the work table, for example, the movement of said table toward the right of Fig. 3, an abutment 24 carried by the piston rod 23 engages a fixed abutment 25 carried by the bed of the machine at the adjacent end of the hydraulic cylinder 21. As the movable stop member 24 engages the fixed stop member 25, the build-up of pressure in the cylinder 21 causes a blow-off of said pressure to the hydraulic motor 70, shown in Fig. 8, to cause a revolution of the shaft 73 carrying a pinion 74 which engages the ring gear 75 mounted on the outer periphery of the barrel 33 to rotate said barrel through 180°. At the same time a limit switch energizes a solenoid 26 which operates a reciprocating cam 27 for the purpose of releasing the latch member 28 from its corresponding stop or recess 28a formed in the outer periphery of the barrel or drum 33 and to move another latch member 29 into position so as to be ready to fall into or engage its corresponding stop or notch 29a formed in the face or outer periphery of said barrel. On further rotation of the barrel through 180° the second latch member 29 falls into engagement with its corresponding stop or notch 29a of the barrel 33, see Fig. 12. At the completion of rotation of the barrel 33 through 180° and by means of a two-way valve, the fluid pressure is diverted to the opposite end of the cylinder 21 and consequently, to the opposite face of the piston 22 therein to reverse the direction of movement or travel of the table. The two-way valve shown as a whole at 90 is actuated by means of a rotatable cam 84 shown in Figs. 6 and 8 of the drawings. This cam is provided with a high surface 84a and a low surface 84b, these surfaces being engaged by a roller 92 which is carried by a spring pressed plunger 91. As the cam revolves and the juncture of the high and low surfaces reaches the anti-friction roller 92, the spring forces the roller onto the low surface of the cam, thus actuating the valves to reverse the flow of fluid which fluid then travels to the opposite end of the cylinder and consequently to the opposite face of the piston. The table thus is caused to travel to the end of its reverse stroke and the abutment 24a carried by the opposite end of the table engages a fixed abutment 25a on the frame or bed of the machine at the adjacent side of the table. The pressure which is built up behind the piston 22 is relieved by permitting a portion of this pressure to pass to the hydraulic motor, previously mentioned, and through the shaft and piston connection heretofore described cause the barrel to rotate through 180°. At the same time that the table engages the stop 25a, another and similar solenoid 26a actuates a switch to cause the reciprocating cam 27 to shift in the opposite direction to release latch 29 from engagement with its corresponding stop 29a and to place the other latch 28 in position so that it may engage its corresponding stop 28a upon further rotation of the barrel through 180°. At one predetermined point during the revolution of the barrel 33 through 360°, one of the points of the star wheel 82 engages a fixed member or finger 88 carried on the rear face or wall of the head housing 29. Such engagement of the star wheel point 83 with said finger effects rotation of the shaft upon which said star wheel is mounted causing the pinion carried by said shaft is in mesh with a ring gear which carries the stepped cam 54 with it, to advance the cam so as to present the next adjacent stepped face thereof to the anti-friction roller 53 carried by the yoke-like plunger 52. It will be understood that during each complete revolution of the barrel, namely, its rotation through 360°, one stepped face of the cam 54 is shifted.

*The star wheel for advancing the face cam and the mechanism for operating the same*

The rear or inner face of the housing 29 is provided with an extension or supporting bracket 28 to which is attached a hydraulic motor, such as a Vickers pump, for supplying the power to rotate or drive the cylindrical barrel 33 and its associated parts. The inner or forward walls of the hydraulic motor or pump 70 are provided with a projecting portion 71. A short stub shaft 72 extends forwardly from the portion 71. The purpose of the projection 71 is to center and permit the alignment of the pump with relation to the drive shaft 73 to the inner or forward end of which a pinion 74 is attached. This pinion 74 is maintained constantly in mesh with a ring gear 75 which is keyed or otherwise secured to the outer circumference or periphery of the rotatable barrel or drum 33. A stub shaft 72 and the drive shaft 73 are secured or locked together by means of a suitable coupling device which is shown as a whole at 76. The hydraulic motor 70 is held in place upon the rear face of the bracket member 28 by bolts or the like 71a which, as seen in Fig. 8, are threaded into the body of the pump casing or housing. An oil seal 77 surrounds the drive shaft 73 to prevent the escape of oil or other lubricants.

The face cam 54 which has a series of stepped faces, preferably thirty to forty in number, is fixed to and carried by a ring gear 78 which binds a rotative bearing or journal in the retainer ring 32. A star wheel shaft 79 extends through a plane bearing 80 which is located in a bored hole formed in the inner or retainer ring 32. The star wheel shaft 79 carries at its inner or forward end a pinion 81 which, as best seen in Fig. 8, is constantly in mesh with the teeth of the ring gear 78. The outer end of the shaft 79 carries a star wheel which is shown as a whole at 82, see particularly Figs. 6 and 8. This star wheel, mentioned above, as shown, is provided with six outwardly projecting or radial fingers 83. The face cam 54 and the ring gear 78 are preferably held together as a rotatable unit by means of the retainer ring or member 32. This unit, constituting the ring gear, the face cam, the retainer ring 32 and the star wheel 82 and its shaft and pinion, is adapted to be revolved as a unit relative to the rear face or wall of the housing 29. The high speed tool spindle 40 is, of course, capable of being rotated at high speed independently of the previously mentioned unit, said high speed tool spindle receiving its power from a belt which runs over the pulley 40a shown in Fig. 8. The star wheel 82 is preferably fixed to the shaft 79 by a taper pin 85. It will be understood that as the hydraulic motor 70 drives the shaft 73, barrel or drum 33 will be revolved. As this barrel is revolved, the unit just described which includes the face cam 54, the ring gear 78 and the star wheel mechanism, revolves as a unit with said drum and relative to and independently of the upright rear or back wall of the housing 29.

Mounted upon the rear face or wall of the housing 29 as clearly seen in Fig. 6, is a depending trip finger or the like, shown as a whole at 86. As shown, this finger is in the form of a rearwardly offset depending member which has its base or body portion securely attached to the housing wall by screws or the like 87. A depending finger portion thereof, shown at 88, projects into the path of the rotative movement of the star wheel fingers or projections 83. As the entire rotative unit revolves, the star wheel once during each 360° rotation, presents one of its fingers or projections 83 to the fixed trip finger 88. As said finger is tripped by the fixed finger 83, the star wheel is shifted or rotated by its axis which in turn, through the medium of the shaft 79 and pinion 81 which latter meshes with the ring gear 78, shifts or moves the face cam 54 one step so as to present a new stepped face or surface of the cam 54 to the roller 53. This operation which occurs once during each complete revolution through 360° of the barrel 33, presents a new face of the stepped cam to the roller 53 so as to advance the lower and upper slide members 35 and 34, respectively, and also the grinding tool 41 relative to the reciprocating workpiece, such, for example, as the connecting rod shown in detail in Fig. 25 of the drawings.

As stated above, the indexing of the face cam 54, that is to say the shifting of the cam so as to present the next successive stepped face thereof to the roller 53, occurs once during each cycle of operation of the drum or barrel and the workpiece and its supporting table, which cycle constitutes a half revolution of the drum or barrel 33 through 180°, effecting the forward motion of the workpiece and its supporting table, the further half revolution of the drum or barrel through another 180°, which latter movement of the barrel effects the return travel or movement of the workpiece and its supporting table.

Merely by way of illustration or example, the face cam 54 of the present machine is designed with and actuated so as to present approximately forty stepped faces successively to the anti-friction roller 53. At the end of this succession of advancing stepped faces, the roller 53 drops off the high point or last raised face or surface of the cam and is moved inwardly or rearwardly by virtue of the compression spring 55 which serves to shift the plunger 52 and anti-friction roller 53 and also the bottom or lower slide member 35 rearwardly so that the pressure being exerted by the springs 36, 36 return the upper slide to its starting position. This return of the parts to their normal or starting positions occurs only at the completion of the grinding operation upon one of the workpieces.

It is to be understood that the machine of the present invention is started by operating a conventional push button or switch to start the cycle, that is, the rotation of the drum or barrel 33 throughout 360° to advance the face cam 54 one step. In other words, each complete revolution of the barrel advances the cam one step. A normally closed micro-switch 60 is actuated by a projection or abutment 54a located on the rear face of the cam at the lowest step or face thereof, said projection engaging the adjacent tip or end 61 of a plunger to move the stem or shank 62 thereof against a spring pressed ball 63 to momentarily open the normally closed micro-switch 60 to break the electrical circuit (not shown) after one complete cycle of said barrel 33.

A rear face plate 93 having a central opening 93a fits over the spindle cartridge 39 with a friction fit and is held in place against the retainer ring 32 by means of compression springs (not shown), which surround cap screws or studs 95 passing through holes or openings in the plate and which are inserted into the retainer ring 32. The outer face of the plate 93 is provided with an annular recess to receive an oil seal 96. The plate 93 adjacent the star wheel 82 is provided, as shown, with a notch to accommodate the boss which surrounds the star wheel shaft 79.

*Diamond wheel dresser unit or assembly*

Figure 16:
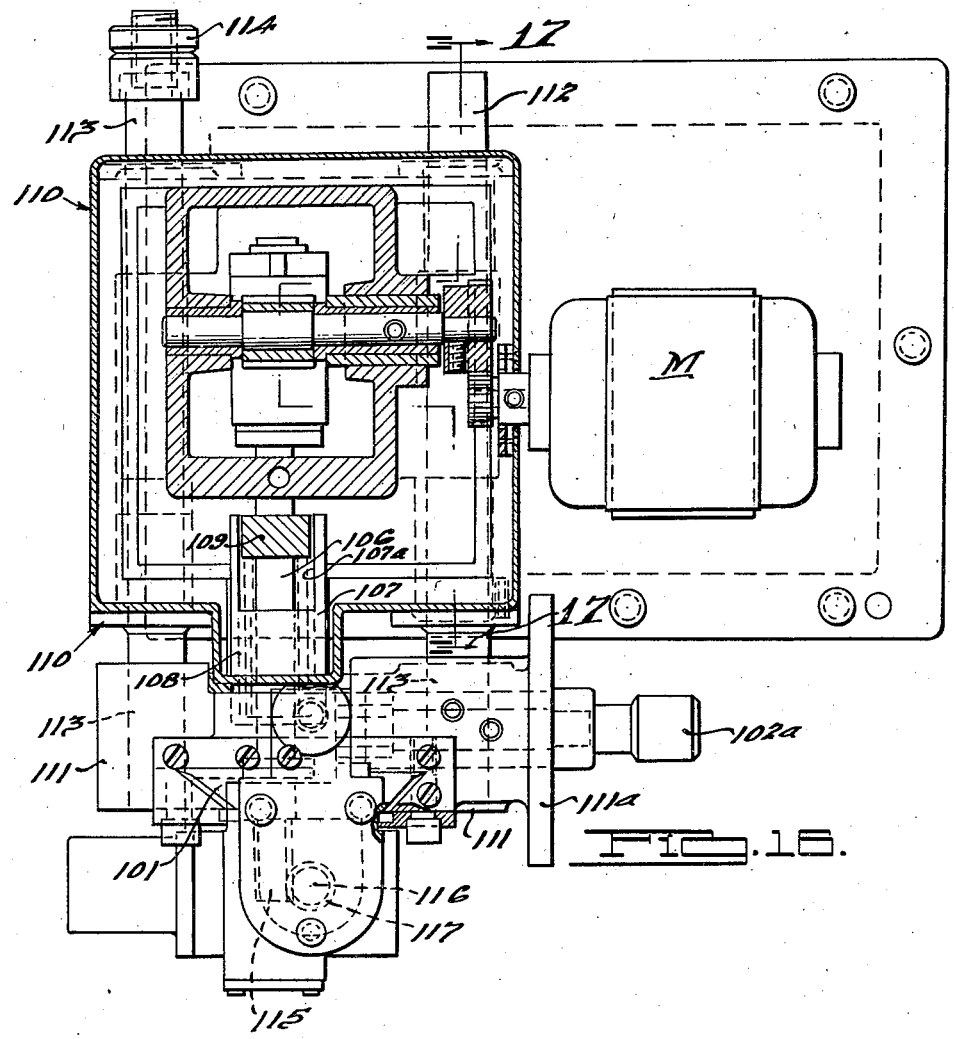
Fig. 16 is a top plan view, partly in section, taken substantially along the line 16—16 of Fig. 15, looking in the direction of the arrows.
Figure 25:
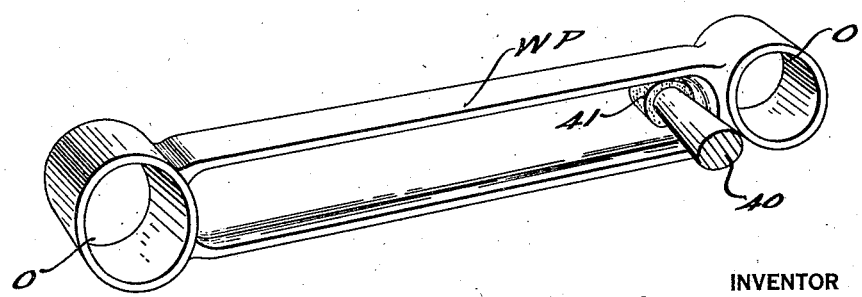
Fig. 25 is a perspective view showing a connecting rod with the grinding tool in one of its operating positions.
Figure 17:
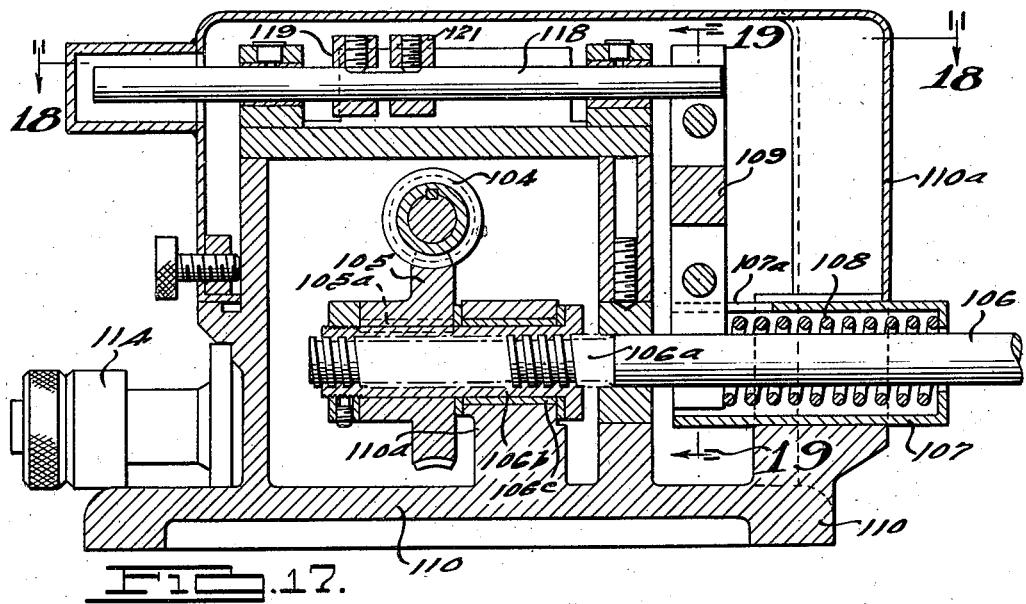
Fig. 17 is a sectional view on a somewhat enlarged scale, taken substantially along the line 17—17 of Fig. 16, looking in the direction of the arrows.
Figure 18:
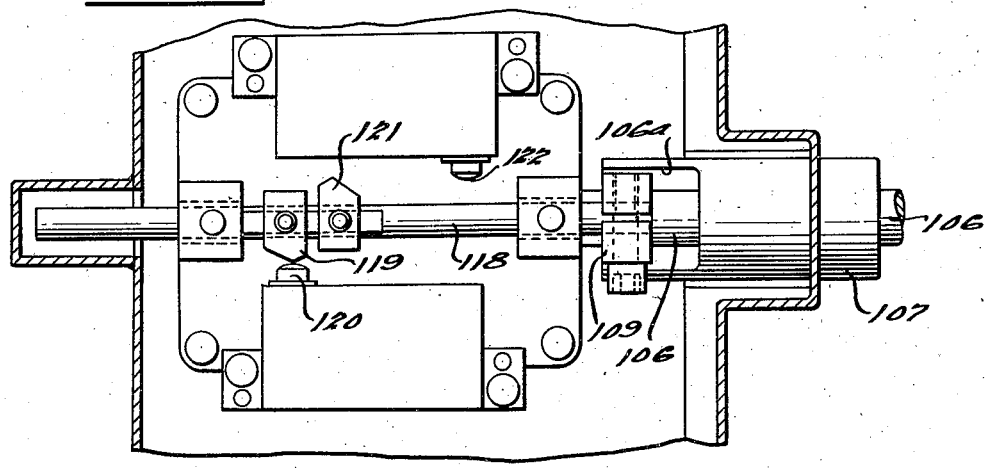
Fig. 18 is a horizontal sectional view, partly in elevation, taken substantially along the line 18—18 of Fig. 17, looking in the direction of the arrows.
Figure 19:
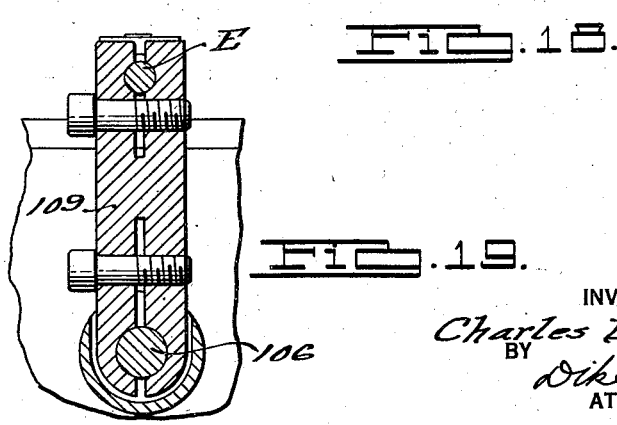
Fig. 19 is a detailed vertical sectional view taken substantially along the line 19—19 of Fig. 17, looking in the direction of the arrows.

To dress the grinding tool or wheel 41 a diamond tool or wheel dresser unit or assembly shown as a whole at 100 is provided. The diamond tool 100a is carried by a slide 101 adapted to be raised and lowered by a crank member 102. The diamond tool dresser 100a is lowered to the position in which it is shown in Fig. 15 by rotating the crank 102. A button is then pressed to start an electric motor M, shown in Fig. 2, which rotates a worm 104 meshing with a worm gear 105 to advance or move the threaded shaft 106 forwardly. As seen in Fig. 17, a portion of the shaft 106 is surrounded by a combined spring retainer and stop 107 which, as shown, is in the form of a tubular cap which serves as a dust shield to prevent the ingress of foreign particles to the gearing. The tube 107 is provided with a slot 107a at its inner end, see Figs. 16 and 17, and the outer end of the member 107 projects beyond the cover or wall 110a of the gear housing 110. The enclosed portion of the shaft 106 is surrounded by a preloaded tension spring 108. The outer or forward end of this tension spring seats against a clamp member 109 carried by the shaft 106. As the shaft 106 and the movable body portion 111 are moved forwardly with respect to the fixed gear housing or body member 110, the coil spring 108 is placed under compression. The movable portion or body member 111 of the tool dresser unit (see Figs. 2 and 16) travels forwardly carrying with it the slide or alignment pins 112 and 113 until an adjustable stop member 114 carried by the inner end of the pin 113 engages the adjacent face of the worm gear housing 110 to stop the forward movement or advance of the member 111. At this point, the preloaded tension coil spring 108 which has started to be compressed after the stop 114 has engaged the worm gear housing 110, starts to expand and moves the member 111 forwardly, causing the rack 115 carried by the end of the shaft 106 and which is in mesh with the teeth 117 of a stick pinion 116, to rotate the pinion and thus move the diamond tool dresser 100a and its supporting arm 100b over the radius of the grinding wheel 41. During this projecting movement of the rack 115 under the action of the spring 108, the fixed clamp member 109 carried by the shaft 106 and which serves as a stop for the inner end of the spring 108 and whose upper end is clamped to a trip shaft 118, moves the shaft 118 axially until an adjustable contact member 119 carried thereby engages a micro-switch 120 to reverse the electric motor M. The spring 108 tends to hold the member 111 in spaced relation to the member 110 and the worm 104 and worm gear 105 retract or move the shaft 106 and its rack 115 rearwardly or inwardly and thus rotate the stick pinion 116 in the opposite direction to return the diamond tool dresser 100a to its original position, as shown in Fig. 15, with the tool holding bracket or arm 100b in perpendicular position against the stop pin 100c. The pin 100c is carried by the slide 101 and projects into the path of the bracket member 100b, see Fig. 15. By reversing the motor M, the worm 104 and worm gear 105 will be rotated in a reverse direction and the shaft 106 also shifted in the reverse direction to move the entire member 111 inwardly or rearwardly toward the housing member 110 until a second adjustable contact 121 on the shaft 118 engages a second microswitch 122 which remains normally closed and which will function to stop the electric motor M (see Figs. 2 and 16) and the movement of the parts. During the reverse travel of the shaft 106 and associated parts as described above, the diamond cutter 100a is caused to move over the radius of the grinding wheel 41 and again assume its upright position as shown in Fig. 15.

One purpose of the spring 108 which surrounds the threaded shaft 106 is to maintain the parts in normally spaced relation. It will be understood that this spring remains in its normal condition until after the adjustable stop 114 carried by the pin or shaft 113 engages the body member 110 during the outward movement of the shaft 106, after which the spring 108 is placed under compression.

As clearly seen in Fig. 17, the inner end portion of the shaft 106 is externally threaded at 106a and is surrounded by an internally threaded sleeve 106b. The worm gear 105 is keyed at 105a to the sleeve 106a so that rotation of the worm 104 will cause rotation of the worm gear 105 and the sleeve 106a as a unit. The threads on the sleeve and shaft cooperate or interfit so that rotation of the sleeve effects the axial movement or travel of the shaft in either direction, dependent upon the direction of rotation of the worm gear 105. The sleeve 106b is mounted for rotation in a bushing 106c located in a base or bearing formed in an upright portion or standard projecting from the base of the fixed portion 110 of the diamond wheel dresser unit.

As seen in Figs. 15 and 24, the lower end of the stick pinion 116 carries a bevel pinion 125 which is keyed or pinned thereto and which meshes with a similar pinion 126 which is mounted on and secured to a horizontal shaft 127. The shaft 127, as shown, is mounted in a pair of longitudinally spaced anti-friction bearing assemblies 128 and supports at one end the oscillatable bracket 100b which carries the diamond cutter 100a. The opposite end portion 127a of the shaft 127 is of reduced diameter and projects into a removable cap or closure member 129 which is removably secured by means of screws or bolts 130 to a wall of the body portion of the slide 101. A torsion spring 131 is located within the cap 129 and surrounds the shaft portion 127a. The outer end of this spring is attached to the cap member and its inner end is connected to the shaft 127, 127a in any suitable and convenient manner. This spring 131 performs the dual functions of maintaining the shaft 127 in such a position as to maintain the offset end of the bracket 100b and the diamond cutter 100a normally in vertical position and perpendicular to the longitudinal center or axis of the cutter 41, and likewise prevent any backlash in the intermeshing pinion gears 125 and 126.

The crank 102 carries a knob or button 102a and a slidable locking pin 102b which pin is adapted to register with and seat in sockets or holes 102c formed in the adjacent face of the disk-like member 111a. The crank is mounted upon and pinned to the reduced outer end of a rotary horizontal shaft 135 whose inner reduced end portion carries a gear 136 meshing with a rack 137 carried by the slide 101. By rotating or oscillating the crank 102, the gear 136 will move the rack 137 and likewise the slide 101 up or down, as the case may be to move the diamond tool 100a into or out of operative position with relation to the grinding wheel 41. The wheel dresser assembly 100 is provided with an adjustable micrometer stop 138 to permit accurate and minute adjustment of the cutter 100a with relation to the grinding wheel 41.

The work holding fixture

Figure 4:
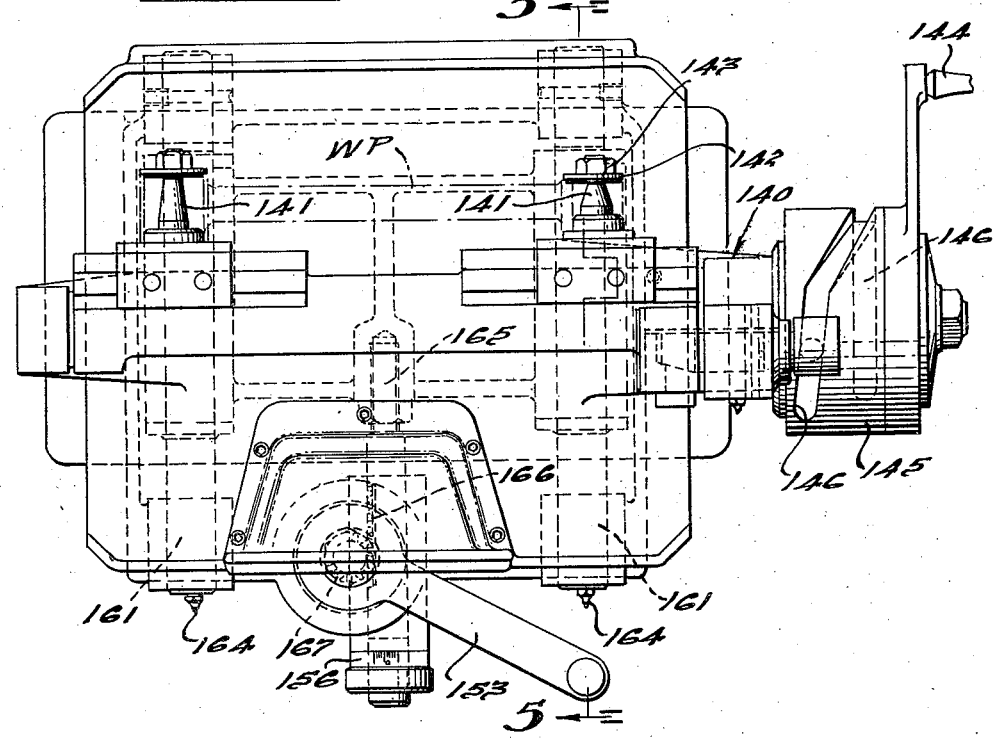
Fig. 4 is an enlarged top plan view of the work holding fixture of the machine taken substantially along the line 4—4 of Fig. 3, looking in the direction of the arrows.
Figure 5:
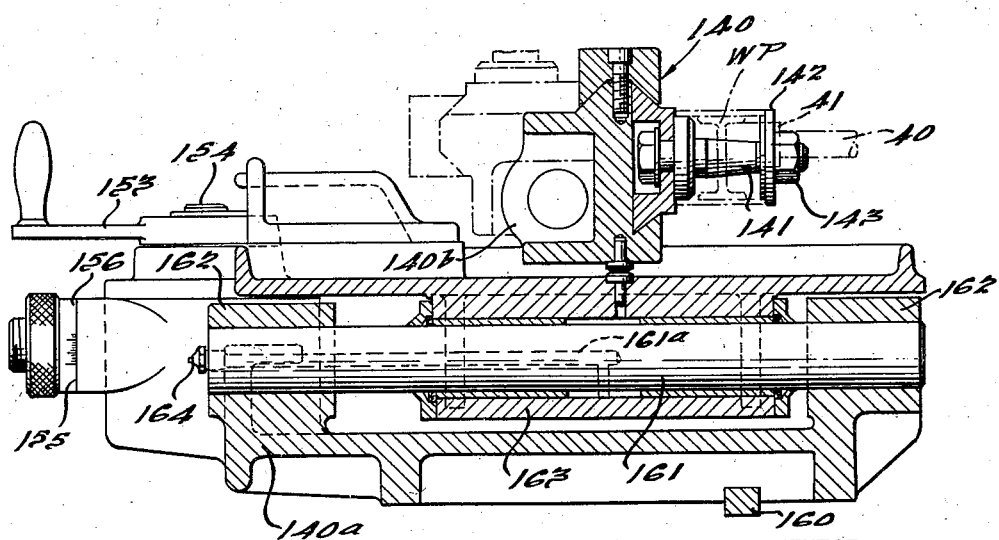
Fig. 5 is a sectional view taken substantially along the line 5—5 of Fig. 4, looking in the direction of the arrows.

The work fixture of the present machine is best shown in Figs. 1, 2, 3, 4 and 5 of the drawings. It is the type of fixture which permits the workpiece, in the present instance the connecting rod W. P. of Fig. 25, to be inserted from above or at the top of the fixture. The openings O in the end of the connecting rod are adapted to be registered with vertically positioned studs or pins 141 carried by the fixture and are slipped over the threaded outer ends of the studs to which washers 142 and nuts 143 are applied to hold the workpiece or connecting rod W. P. in place. The crank handle 144 shown at the right of Figs. 3 and 4, is then turned in a clockwise direction which serves to turn the work fixture 140 rearwardly toward the grinding wheel 41 through 90°. The body portion 145 of the crank member is provided with a cam slot 146 and a pin 148 depends from a short reciprocable shaft 147 which extends through a horizontal bore or opening 149 formed in an upright portion 150 of the body of the work fixture 140. As the crank 144 is turned in a clockwise direction, the pin 148 rides in the cam slot 146, and when the fixture reaches its horizontal position opposite the grinding wheel 41, the pin 148 forces the stud or shaft 147 which carries it through an aligned or registering opening or bore 152 formed in the rotatable portion 151 of the work fixture so as to hold said fixture accurately in position with the supported connecting rod having its web portion facing or opposite to the front face of the grinding wheel 41. A second crank or hand lever 153, seen in Figs. 4 and 5, is then operated to slide the entire fixture rearwardly or toward the grinding wheel 41, said grinding wheel and a portion of its supporting spindle 40 being seen in broken lines in Fig. 5. The crank handle 144, body portion 145, the pin 148 and cam slot 146 thus combine to first position the work fixture 140 in its full line position of Fig. 5 with the work in strict alignment with the grinding wheel 41 and by virtue of the shaft 147 and opening or bore 152, to maintain the parts in this position. The second crank and handle 153 are then moved about the pivot 154 to shift the work fixture and connecting rod W. P. in such position inwardly toward the grinding wheel 41 and into the proper predetermined position with relation to said grinding wheel. As best seen in Fig. 5, the base portion 140a of the body of the fixture 140 is provided with a flat shoulder or stop portion 155 which is adapted to be engaged by a graduated adjustable stop 156 carried by the upper portion 140b of the work fixture. By setting this graduated adjustable stop 156 properly, the exact amount of inward movement or travel of said upper fixture portion 140b toward the grinding wheel or tool 41 may be accurately determined and controlled. The graduated adjustable stop 156 bottoms upon the shoulder 155 and thus limits this inward movement or travel.

Figure 2:
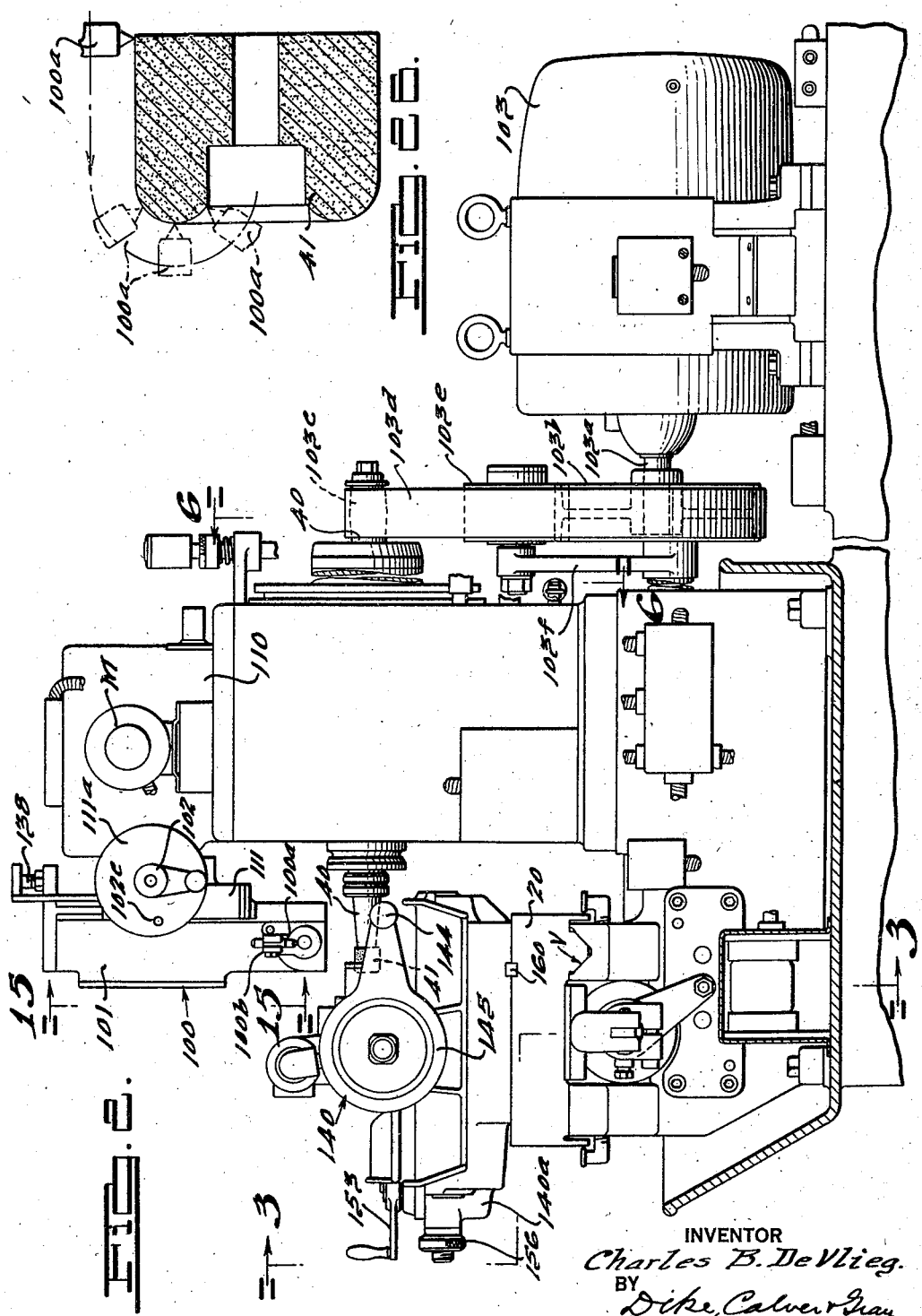
Fig. 2 is an enlarged elevational view, partly broken away, of the right hand side of the machine with respect to the position of the machine, as shown in Fig. 1.

It will be understood that the so-called base or lower portion 140a and the upper or adjustable portion 140b of the work holding fixture are mounted, as a unit, upon the transversely reciprocable table 20. The lower portion of the fixture is, as shown in Figs. 1, 2 and 5, keyed to the table 20 by a key or the like 160. Thus the work holding fixture 140, as a unit, is laterally or transversely reciprocable with the table 20, the upper portion or part 140b of the fixture being, however, also movable toward and away from the grinding wheel 41 relative to the base portion 140a of the fixture.

As best seen in Figs. 4 and 5, the upper portion or parts 140b of the fixture are mounted for movement relative to the base portion 140a thereof by means of guide rods or shafts 161 which are journalled at their opposite ends in suitable bearings 162 formed in the base portion 140b of the fixture and which extend through guide bearings formed in depending portions 163 of the upper or adjustable part 140b of the fixture. The purpose of the guide rods or shafts 161 is to support and accurately guide the adjustable members or unit of the fixture toward and from the grinding tool 41. The rods or shafts 161 are drilled to provide passageways 161a for oil, grease or other lubricating material which may be forced into the shafts through fittings 164 to properly lubricate the parts to permit the easy shifting movement of the adjustable portion of the fixture when the crank 153 is actuated.

Means for shifting or adjusting the portion 140b of the fixture comprise, as shown, see particularly Fig. 4, an axially movable shaft 165 which is fixed to the portion 140b and which carries adjacent its forward end a rack or the like 166. The pivot pin or shaft 154 of the crank handle is provided with a gear 167 which is in mesh with the rack so that by moving the crank handle 153 the shaft 165 and the upper structure 140b of the fixture may be moved toward or away from the grinding wheel 41. It will be understood, however, that any suitable supporting and adjusting mechanism for the upper portion of the work fixture unit 140b may be provided. The alignment guide rods or shafts 161 serve to maintain the movable portion 140b of the work fixture in a predetermined position and cause it to follow a straight line path toward the grinding wheel 41. As explained above, the graduated adjustable stop member 156 may be adjusted so as to regulate the length of travel of the adjustable portion 140b of the fixture with relation to the base portion 140a thereof. As shown in Fig. 4, this graduated adjustable stop is axially aligned with the shaft 165.

After the fixture portion or unit 140b has been shifted inwardly toward the grinding wheel 41 so as to properly and accurately position the workpiece W. P. with relation to said grinding wheel, a suitable switch (not shown) is actuated so that hydraulic pressure from the tank T, see Fig. 23, is forced by means of a motor-driven pump P through suitable pipe lines to either end of the hydraulic cylinder 21, see also Fig. 3, to be admitted at one or the other side of the reciprocable piston 22 therein. The piston 22 is mounted upon the piston rod 23 which is attached at its opposite ends to brackets or other members depending from opposite ends of the reciprocable table 20. This structure or mechanism has been previously described in detail above.

Assuming for the purposes of description that it is desired to shift the table 20 toward the left of Figs. 3 and 23, the hydraulic fluid is drawn through the intake sections or conduits 170 to the pump P and forced by said pump through the pipe to a solenoid operated starting valve shown diagrammatically at 174. The fluid from this valve passes through pipe sections 170 to a flow control valve 175 and thence through pipe sections 170 to a cam operated reversing valve 176. From the valve 176, the fluid passes through additional pipe sections 170 to a back pressure valve 177 and thence through pipe sections 170 to a fluid restriction valve 178 from which it passes into the cylinder 21 at the right end of the piston 22. The purpose of the fluid restriction valve 178 is to restrict or reduce the flow of fluid into the cylinder 21 as the piston 22 therein reaches the end of its stroke toward the left end of the cylinder, thus slowing down the stroke at and adjacent the end of said stroke. Adjacent the end of the stroke of the piston 22 and also adjacent the end of the movement of the table 20 toward the left, the abutment 24a carried by the piston rod engages the so-called fixed abutment 25a carried by the bed of the machine at the right or adjacent end of the hydraulic cylinder 21. As the movable stop member 24a engages the stop member or button 25a, the build-up of pressure in the cylinder 21 causes a blow-off of said pressure to the hydraulic motor 70 of Figs. 8 and 23. The operation and function of the parts just described have been previously described and need not be repeated here.

Assuming now that the piston 22 is at the extreme end of its stroke toward the left of the cylinder 21 as shown in Figs. 3 and 23 and it is desirable to return the piston and also the table 20 to the opposite or right end of these views, the motor driven pump P will draw fluid from the tank T and force it through the pipe line 170, solenoid operated starting valve 174, the flow control valve 175 and through the cam operated valve 176 to the pipe line sections or portions 171. Interposed in the pipe line sections 171 is a back pressure valve 179 which corresponds to the valve 177. The fluid from said valve then passes through another pipe section 171 to a fluid restriction valve 180 and thence through the pipe line 171 into the end of the cylinder to the left of the reciprocable piston 22 therein. By virtue of the provision of the restriction valve 180, the flow of fluid into the cylinder is reduced so as to gradually slow down the movement or stroke of the piston 22 and also of the table 20 as the piston and likewise the table approach the end of their stroke toward the right of Figs. 3 and 23. The purpose of reducing the speed of movement of the piston at the opposite ends of its travel in the cylinder 21 and likewise reducing the speed of movement or travel of the table 20 as it approaches the opposite ends of its stroke, is to allow the grinding wheel 41 to completely grind the radius at these opposite ends of the workpiece or connecting rod W. P. It will be understood, however, that while the speed of movement or stroke of the piston 22 and the table 20 which is shifted or reciprocated transversely of the machine by the piston and its connecting rod is reduced or slowed down as it approaches the end of the cylinder, the speed of rotation of the grinding tool 41 and its spindle 40 are maintained constant during the grinding operation on the workpiece.

The cam operated valve 176 for directing the flow of fluid from the pipe line 170 leading from the flow control valve 175 to the cylinder 21 through either of the pipe line connections 170 or 171 which lead to the right and left end portions of the cylinder, respectively, functions to change the flow of fluid from one side of the piston 22 to the opposite side thereof.

Referring now particularly to Fig. 14, there is shown in detail in this figure the parts or elements of the restriction valve 178 located adjacent the right end of the cylinder 21 shown in Figs. 3 and 23. It will be understood that the restriction valve 180 is similar to the valve 178. The purpose of this restriction valve is, as stated above, to reduce the flow of fluid into the right end of the cylinder 21 so as to slow down the movement of the piston 22 and also the table 20 as the table approaches the end of its stroke toward the left. The structure shown in Fig. 14, merely by way of example, comprises a reciprocable valve core 185 which is mounted in a body shown as a whole at 186. The inner end of the valve core as shown, is provided with an axial bore or recess in which is located a coiled tension spring 187. The inner end of this spring seats against a wall at the bottom of the bore and the outer or opposite end of the spring seats against the head of a reciprocable pin or member 188. The free end of the pin 188, as shown in Figs. 3 and 14, is in contact with a partition or wall 190 which extends upwardly from the base or bed 189.

The valve core 185 is surrounded throughout a portion of its length by a bushing 185a which is provided with oppositely disposed ports or openings 199 which register with the feed ports from the supply line sections 170. The valve core has a transverse slot or passage 197 which is adapted to be aligned with the ports or openings 199 in the bushing. The body or core 185 has a longitudinal slot or recess 195 formed therein which, as shown with the parts in their positions of Fig. 14, is in registry with one of the openings 199 formed in the bushing. A transverse slot or passageway 196 of relatively smaller diameter than the passage 197 connects the recess or slot 195 with the opposite port or opening 199. The outer end portion of the valve core 185 is provided with an axial bore for the purpose of receiving and supporting a pin 192 having a head 193 which fits in a socket or recess formed in the contact member or button 25a. This pin is provided with a transverse port or passageway which registers with the transverse port or passageway 196 formed in the valve core. The valve core is recessed adjacent the pin 192 as shown in broken lines, to receive packing material or glands. The head 193 of the pin is preferably provided with a screw driver slot or the like so, if desired, upon loosening a locking key 193a, the pin 192 could be rotated relative to the valve core 185. It will be understood from an examination of Fig. 14 that either of the transverse passageways or ports 197 or 196 may be aligned with the inlet and outlet ports or openings 199 formed in the bushing member 185a, dependent upon the position of the valve core 185 lengthwise with relation to the bushing and the valve body 186. It is desirable to limit the outward movement of the valve core and associated parts under the action of the spring 187 and for this purpose there is provided a pair of adjusting nuts 200 which are threaded onto the threaded end of the valve core 185. By adjusting the position of these nuts, the movement or travel of the valve core outwardly, or to the right of Fig. 14, may be minutely adjusted to meet various conditions.

With the parts as shown in Fig. 14, it will be understood that the table 20 has begun to approach the limit of its travel toward the left of Fig. 3 and, as shown, the restricted passageway or port 196 and the longitudinal port 195 are in registry with the oppositely disposed ports 199. In this position, a restricted or reduced quantity of oil or other fluid is allowed to pass through the valve core and thus the travel or movement of the table and its supported work holding fixture is slowed down. When, however, the port or passageway 197 of the valve body is in registry with the ports 199, 199, the full flow of oil or other fluid is allowed to pass into the cylinder 21 at one end thereof.

Referring now particularly to Figs. 3, 21 and 22, it will be seen that each of the brackets at the ends of the table 20 includes a cap member 205. As a cap member 205 reaches the end of its travel with the table in either direction, it will contact a fixed body member or portion 206. As the cap member 205 engages the fixed body member 206, a pin 208 carried by a cam body 207 will be moved inwardly, shifting the cam body so as to force a pin or rod 209 toward the right of Fig. 21 to actuate the limit switch 210 to stop the movement or travel of the piston 22, piston rod 23 and the table 20.

Referring now particularly to Fig. 23 of the drawings wherein there are shown, diagrammatically, the pipe line connections or conduits of the machine, together with the various valves and the cylinder and piston for reciprocating the table 20, it will be seen that the reversing valve structure 176 is connected with the tank T by means of a return pipe line or conduit 173. It will also be seen that a supply line, namely a one-way feed line 182, connects the solenoid operated starting valve structure 174 with the flow control valve 183 for regulating the flow of oil or other fluid to the Vickers fluid motor 70. A pipe line or conduit 182a connects the Vickers fluid motor 70 with the supply tank T and thus serves as a return line for fluid from the motor to the tank. A drain line 184 also connects the motor 70 with the tank T.

By virtue of the mechanism above described, it will be understood that the reciprocable work supporting table 20 and its associated parts travel approximately twenty strokes at full speed and approximately an additional ten final strokes at reduced speed during each cycle of operation of the machine. After the approximately thirty strokes of the table have been completed, the machine is stopped automatically and the workpiece is removed from the work holding fixture and turned over, as explained above, to present its opposite face or channel portion to the grinding wheel 41. If necessary, the dressing diamond 20 is then brought into position to regrind the face of the grinding wheel 41 prior to the grinding of the newly presented channel, whereupon the machine is again set into operation to cause the table and its supported workpiece W. P. to travel another approximately thirty strokes to complete another cycle of the machine and to thus complete the grinding or finishing operation on the workpiece or connecting rod.

It will be understood that a suitable electric wiring diagram and hook-up, including the necessary switches or control means, will be employed in conjunction with the mechanism of the machine hereinbefore described, such wiring and adjuncts therefor being varied or modified in accordance with the particular needs or requirements of the machine embodying the invention.

The high speed tool spindle 40 of the machine is driven from the motor shaft 103a through a pulley 103b mounted upon said shaft, a pulley 103c mounted upon the inner or rear end of the tool spindle shaft 40 and a drive belt 103d which interconnects the pulleys. An idler pulley 103e mounted upon a bracket arm 103f is adapted to engage the inner face of the belt to maintain it tight or taut.

Referring particularly to Fig. 26 of the drawings, there is illustrated therein the relation of the diamond dressing tool or cutter 100a to the straight or side face and the radius of the grinding wheel 41. It will be seen that the diamond cutting tool travels in a straight line path over the straight or side face of the grinding wheel, as indicated by the arrow at the top of Fig. 26, and then follows the radius of the front face of the grinding wheel, as indicated by the three positions of the diamond cutter shown in broken lines.

Referring particularly to Fig. 27 of the drawings, the cycle required for this operation is one starting with a required length of straight line travel at A, followed by 180° of rotation B, and this followed by a second straight line travel at C opposite to the first, and this followed by a second rotative travel at D in the same direction as the first rotative travel, and repeated. The relation between the wheel head spindle and the work requires a generating action. Because of changing grinding wheel diameters, it is necessary that the wheel contact point at the apex of the eccentric be always in the same relation to the generated cycle.

The diagrammatic view shown in Fig. 28 of the drawings is intended to illustrate one position of the workpiece W. P. with relation to the grinding wheel 41. It is to be understood that means, as previously described, are provided for the purpose of regulating and controlling the relative amount of the feed of the grinding wheel or member 41 axially and co-axially so that all of the surfaces of the channel of the workpiece are finished.

I claim:

1. In an automatic grinding machine for performing grinding operations on the channels of an engine connecting rod in which the machine includes a manually shiftable wheel dressing device operable to dress the grinding wheel of the machine to control the size of the finish operation upon the workpiece, said machine being capable of producing a true generated form to said channels, which comprises coordinating straight and radius forms, a high speed grinding tool rotatable at a constant speed, a workpiece supporting table reciprocable transversely of said machine and relatively to said high speed grinding wheel, and means for feeding the grinding wheel with a high degree of precision progressively relative to the moving workpiece, means for retracting said grinding wheel at the completion of the grinding operation.

2. In an automatic grinding machine for performing grinding operations on the channels of an engine connecting rod, said machine being capable of producing a true generated form to said channels, which comprises a high speed tool spindle, a grinding wheel fixed to the end of said spindle, a work-holding fixture mounted for reciprocating movement transversely of the machine adjacent said grinding wheel, means for adjusting said work-holding fixture toward and away from said grinding wheel, automatic means for progressively advancing the grinding wheel with a high degree of precision toward a workpiece carried by the work-holding fixture, automatic means for reversing the travel of said table after the completion of the rotative stroke of the grinding wheel at the opposite ends of its stroke, means for reducing the speed of travel of said work-holding fixture as it approaches the opposite ends of its travel, and means coordinating the advance movement of the grinding wheel and the reciprocation of the work-holding fixture and workpiece for completing the grinding or finishing operation upon the workpiece during one complete cycle constituting the advance movement of the grinding wheel in accordance with a predetermined number of strokes of the work-holding fixture and workpiece.

3. In an automatic grinding machine for performing grinding operations on the channels of an engine connecting rod, said machine being capable of producing a true generated form to said channels, which comprises a high speed tool spindle, a grinding wheel fixed to the forward end of said spindle, a work-holding fixture mounted for reciprocating movement by hydraulic means transversely of the machine adjacent said grinding wheel, means for adjusting said work-holding fixture toward and away from said grinding wheel, automatic means for progressively advancing the grinding wheel accurately toward a workpiece carried by the work-holding fixture, automatic means for reversing the travel of said table at opposite ends of its stroke, means for reducing the speed of travel of said work-holding fixture after the rotative stroke of the grinding wheel at the opposite ends of its travel, means coordinating the advance movement of the grinding wheel and the reciprocation of the work-holding fixture and workpiece for completing the grinding or finishing operation upon the workpiece during one complete cycle constituting the advance movement of the grinding wheel in accordance with a predetermined number of strokes of the work-holding fixture and workpiece and means for automatically cutting off the operation of the machine upon the completion of the grinding operation upon the workpiece.

4. In an automatic grinding machine for performing grinding operations on the channels of an engine connecting rod, said machine being capable of producing a true generated form to said channels, which comprises a high speed tool spindle, a grinding wheel fixed to the end of said spindle, a work-holding fixture mounted for reciprocating movement transversely of the machine adjacent said grinding wheel, means for adjusting said work-holding fixture toward and away from said grinding wheel, automatic means for progressively advancing the grinding wheel with a high degree of precision toward a workpiece carried by the work-holding fixture, automatic means for reversing the travel of said table at opposite ends of its travel and after the rotative stroke of the grinding wheel has been completed, means for reducing the speed of travel of said work-holding fixture as it approaches the opposite ends of its travel, means coordinating the advance movement of the grinding wheel and the reciprocation of the work-holding fixture and workpiece for completing the grinding or finishing operation upon the workpiece during one complete cycle constituting the advance movement of the grinding wheel in accordance with a predetermined number of strokes of the work-holding fixture and workpiece, hydraulic means for effecting the reciprocating movement of the work-holding fixture and the progressive advance movement of the grinding wheel, and electrically controlled and actuated means for starting and stopping the operation of the machine.

5. In an automatic grinding machine for performing grinding operations on the channels of an engine connecting rod in which the machine includes a manually shiftable wheel dressing device automatically operable to dress the grinding wheel to control the size of the finish operation performed upon the workpiece, said machine being capable of producing a true generated form to said channels, which comprises coordinating straight and radius forms, a high speed grinding tool rotatable at a constant speed, a workpiece supporting table reciprocable transversely of said machine and relatively to said high speed grinding wheel, cam means for moving the grinding wheel progressively toward the moving workpiece with a high degree of precision, automatically operable means for moving said grinding wheel away from said workpiece at the completion of the grinding operation.

6. In an automatic grinding machine for performing grinding operations on the channels of an engine connecting rod, said machine being capable of producing a true generated form to said channels, which comprises a high speed tool spindle, a grinding wheel fixed to the end of said spindle, a work-holding fixture mounted for reciprocating movement transversely of the machine adjacent said grinding wheel, means for adjusting said work-holding fixture toward and away from said grinding wheel, power operated cam means for progressively advancing the grinding wheel with a high degree of precision toward a workpiece carried by the work-holding fixture, automatic means for reversing the travel of said table after the completion of the rotative stroke of the grinding wheel at the opposite ends of its stroke, means for reducing the speed of travel of said work-holding fixture as it approaches the opposite ends of its travel, and means coordinating the advance movement of the grinding wheel and the reciprocation of the work-holding fixture and workpiece for completing the grinding or finishing operation upon the workpiece during one complete cycle constituting the advance movement of the grinding wheel in accordance with a predetermined number of strokes of the work-holding fixture and workpiece.

7. In an automatic grinding machine for performing grinding operations on the channels of an engine connecting rod, said machine being capable of producing a true generated form to said channels, which comprises a high speed tool spindle, a grinding wheel fixed to the end of said spindle, a work-holding fixture mounted for reciprocating movement transversely of the machine adjacent said grinding wheel, means for adjusting said work-holding fixture toward and away from said grinding wheel, power operated cam means for progressively advancing the grinding wheel with a high degree of precision toward a workpiece carried by the work-holding fixture, automatic means for reversing the travel of said table after the completion of the rotative stroke of the grinding wheel at the opposite ends of its stroke, means for reducing the speed of travel of said work-holding fixture as it approaches the opposite ends of its travel, and hydraulically actuated means for reciprocating said work-holding fixture a predetermined number of strokes transversely of the machine during a single cycle of operation of said power operated cam means for progressively advancing said grinding wheel.

8. In an automatic grinding machine for performing grinding operations on the channels of an engine connecting rod, said machine being capable of producing a true generated form to said channels, which comprises a high speed tool spindle, a grinding wheel fixed to the end of said spindle, a work-holding fixture mounted for reciprocating movement transversely of the machine adjacent said grinding wheel, means for adjusting said work-holding fixture toward and away from said grinding wheel, automatic means for progressively advancing the grinding wheel with a high degree of precision toward a workpiece carried by the work-holding fixture, automatic means for reversing the travel of said table after the completion of the rotative stroke of the grinding wheel at the opposite ends of its stroke, means for reducing the speed of travel of said work-holding fixture as it approaches the opposite ends of its travel, means for accelerating the speed of travel thereof at a predetermined time after its speed has been reduced, and means coordinating the advance movement of the grinding wheel and the reciprocation of the work-holding fixture and workpiece for completing the grinding or finishing operation upon the workpiece during one complete cycle constituting the advance movement of the grinding wheel in accordance with a predetermined number of strokes of the work-holding fixture and workpiece.

9. In an automatic grinding machine for performing grinding operations on the channels of an engine connecting rod, said machine being capable of producing a true generated form to said channels, which comprises a high speed tool spindle, a grinding wheel fixed to the end of said spindle, a work-holding fixture mounted for reciprocating movement transversely of the machine adjacent said grinding wheel, means for adjusting said work-holding fixture toward and away from said grinding wheel, an automatically operated face cam having a plurality of cam faces for progressively advancing the grinding wheel with a high degree of precision toward a workpiece carried by the work-holding fixture, indexing means associated with said face cam for progressively shifting successive faces of the cam step by step, automatic means for reversing the travel of said table after the completion of the rotative stroke of the grinding wheel at the opposite ends of its stroke, means for reducing the speed of travel of said work-holding fixture as it approaches the opposite ends of its travel, and means coordinating the advance movement of the grinding wheel and the reciprocation of the work-holding fixture and workpiece for completing the grinding or finishing operation upon the workpiece during one complete cycle constituting the advance movement of the grinding wheel in accordance with a predetermined number of strokes of the work-holding fixture and workpiece.

10. In an automatic grinding machine for performing grinding operations on the channels of an engine connecting rod, said machine being capable of producing a true generated form to said channels, which comprises a high speed tool spindle, a grinding wheel fixed to the forward end of said spindle, a work-holding fixture mounted for reciprocating movement by hydraulic means transversely of the machine adjacent said grinding wheel, means for adjusting said work-holding fixture toward and away from said grinding wheel, an automatically shiftable face cam for progressively advancing the grinding wheel accurately toward a workpiece carried by the work-holding fixture, automatic means for reversing the travel of said table at opposite ends of its stroke, means for reducing the speed of travel of said work-holding fixture after the rotative stroke of the grinding wheel at the opposite ends of its travel, means coordinating the advance movement of the grinding wheel and the reciprocation of the work-holding fixture and workpiece for completing the grinding or finishing operation upon the workpiece during one complete cycle constituting the advance movement of the grinding wheel in accordance with a predetermined number of strokes of the work-holding fixture and workpiece and means for automatically cutting off the operation of the machine upon the completion of the grinding operation upon the workpiece.

11. In an automatic grinding machine for performing grinding operations on the channels of an engine connecting rod, said machine being capable of producing a true generated form to said channels, which comprises a high speed tool spindle, a grinding wheel fixed to the end of said spindle, a work-holding fixture mounted for reciprocating movement transversely of the machine adjacent said grinding wheel, means for adjusting said work-holding fixture toward and away from said grinding wheel, an automatically movable cam device for progressively advancing the grinding wheel with a high degree of precision toward a workpiece carried by the work-holding fixture, automatic means for reversing the travel of said table at opposite ends of its travel and after the rotative stroke of the grinding wheel has been completed, means for reducing the speed of travel of said work-holding fixture as it approaches the opposite ends of its travel, means coordinating the advance movement of the grinding wheel and the reciprocation of the work-holding fixture and workpiece for completing the grinding or finishing operation upon the workpiece during one complete cycle constituting the advance movement of the grinding wheel in accordance with a predetermined number of strokes of the work-holding fixture and workpiece, hydraulic means for effecting the reciprocating movement of the work-holding fixture and the progressive advance movement of the grinding wheel, and electrically controlled and actuated means for starting and stopping the operation of the machine.

12. In an automatic grinding machine for automatically grinding channels in articulate connecting rods for airplane engines in which the machine includes a grinding wheel dresser for redressing the grinding wheel to generated form, said machine comprising a hydraulically actuated table movable in substantially a straight-line path and in opposite directions transversely of the machine, a work-holding fixture adapted to support an articulate connecting rod mounted upon and movable with said table, cooperating stop means located adjacent to opposite ends of said table for effecting the movement of the table in forward and reverse directions, a power driven high speed grinding wheel and spindle for supporting the same, a hydraulically actuated carrier for advancing said wheel toward said connecting rod, and a hydraulic circuit for coordinating the actuation of the table, grinding wheel and carrier whereby to generate a true radius at each end of the stroke of said table and fixture.

13. In an automatic grinding machine for automatically grinding channels in articulate connecting rods for airplane engines in which said machine includes an automatically operated grinding wheel dresser for redressing said grinding wheel to generated form and in which said dresser has means for adjusting its position with relation to the grinding wheel whereby to control the width of the channel in said connecting rod, said machine comprising a hydraulically actuated table movable in substantially a straight-line path and in opposite directions transversely of the machine, a work-holding fixture adapted to support an articulate connecting rod mounted upon and movable with said table, cooperating stop means located adjacent to opposite ends of said table for effecting the movement of the table in forward and reverse directions, a power driven high speed grinding wheel and spindle for supporting the same, a hydraulically actuated carrier for advancing said wheel toward said connecting rod, and a hydraulic circuit for coordinating the actuation of the table, grinding wheel and carrier whereby to generate a true radius at each end of the stroke of said table and fixture.

CHARLES B. DE VLIEG.